United States Patent
Ito

(10) Patent No.: US 12,263,845 B2
(45) Date of Patent: Apr. 1, 2025

(54) VEHICLE CONTROL APPARATUS, VEHICLE, ACCELERATION-AND-DECELERATION CONTROL METHOD, AND VEHICLE CONTROL PROGRAM

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 18/077,961

(22) Filed: Dec. 8, 2022

(65) Prior Publication Data

US 2023/0192097 A1    Jun. 22, 2023

(30) Foreign Application Priority Data

Dec. 20, 2021   (JP) .................................. 2021-205822

(51) Int. Cl.
| | | |
|---|---|---|
| *B60W 40/08* | (2012.01) | |
| *B60W 30/08* | (2012.01) | |
| *B60W 30/16* | (2020.01) | |

(52) U.S. Cl.
CPC ............ *B60W 40/08* (2013.01); *B60W 30/08* (2013.01); *B60W 30/16* (2013.01); *B60W 2420/403* (2013.01); *B60W 2540/229* (2020.02)

(58) Field of Classification Search
CPC ...... B60W 40/08; B60W 30/08; B60W 30/16; B60W 2420/403; B60W 2540/229
See application file for complete search history.

(56) References Cited

U.S. PATENT DOCUMENTS

| | | |
|---|---|---|
| 8,355,851 B2 | 1/2013 | Inoue et al. |
| 8,370,040 B2 | 2/2013 | Inoue et al. |
| 8,417,430 B2 | 4/2013 | Saeki |
| 8,548,709 B2 | 10/2013 | Morita |
| 8,768,597 B2 | 7/2014 | Kagawa |
| 9,174,643 B2 | 11/2015 | Aso |
| 10,017,178 B2 | 7/2018 | Morimoto et al. |
| 10,118,617 B2 | 11/2018 | Urano et al. |
| 10,486,698 B2 | 11/2019 | Masui et al. |
| 2017/0232973 A1 | 8/2017 | Otake |
| 2019/0092321 A1 | 3/2019 | Shimizu et al. |
| 2019/0295419 A1 | 9/2019 | Tosa et al. |

(Continued)

FOREIGN PATENT DOCUMENTS

| | | |
|---|---|---|
| JP | 2005-081999 A | 3/2005 |
| JP | 4453665 B2 | 4/2010 |

(Continued)

*Primary Examiner* — Hunter B Lonsberry
*Assistant Examiner* — Harrison Heflin
(74) *Attorney, Agent, or Firm* — Sughrue Mion, PLLC

(57) ABSTRACT

A vehicle control apparatus performs an acceleration suppressing control to suppress an acceleration of a vehicle, when a distracted state detected based on a driver's seat image continues for a predetermined first time. The distracted state is a state in which an attentiveness for driving of the driver is impaired. The vehicle control apparatus performs a deceleration control to decelerate the vehicle to stop the vehicle, when the distracted state continues for a predetermined second time that is longer than the first time.

9 Claims, 16 Drawing Sheets

(56) References Cited

U.S. PATENT DOCUMENTS

| | | | |
|---|---|---|---|
| 2020/0070825 A1* | 3/2020 | Sugano | B60W 40/08 |
| 2020/0130654 A1 | 4/2020 | Kamada et al. | |
| 2020/0282984 A1* | 9/2020 | Mizoguchi | B60W 60/005 |
| 2021/0237719 A1* | 8/2021 | Chen | F02D 11/107 |
| 2022/0105984 A1* | 4/2022 | Kojo | B60W 30/12 |
| 2023/0399013 A1* | 12/2023 | Kume | B60W 30/162 |

FOREIGN PATENT DOCUMENTS

| | | |
|---|---|---|
| JP | 2010-125921 A | 6/2010 |
| JP | 2010-125922 A | 6/2015 |
| JP | 2016-085563 A | 5/2016 |
| JP | 2017-144808 A | 8/2017 |
| JP | 2019-059299 A | 4/2019 |
| JP | 2020-069898 A | 5/2020 |
| JP | 2020-082968 A | 6/2020 |

* cited by examiner

VEHICLE CONTROL APPARATUS, VEHICLE, ACCELERATION-AND-DECELERATION CONTROL METHOD, AND VEHICLE CONTROL PROGRAM

TECHNICAL FIELD

The present disclosure relates to a vehicle control apparatus for accelerating and decelerating a vehicle (host vehicle) (or for controlling an acceleration and a deceleration of a vehicle) based on a state of a driver of the vehicle, a vehicle in which the vehicle control apparatus installed, an acceleration-and-deceleration control method for accelerating and decelerating the vehicle (or for controlling an acceleration and a deceleration of the vehicle) based on the state of the driver of the vehicle, and a vehicle control program for accelerating and decelerating the vehicle (or for controlling an acceleration and a deceleration of the vehicle) based on the state of the driver of the vehicle.

BACKGROUND

There has been a known vehicle control apparatus configured to perform a deceleration control when a driver of a vehicle (host vehicle) has fallen into an abnormality state.

For example, a vehicle control apparatus (hereinafter, referred to as a "conventional apparatus"), disclosed in Japanese Patent Application Laid-Open No. 2020-82968, determines whether or not the driver is in a distracted state that is a state before the driver falls into the abnormality state based on a driving state of the driver and a face image of the driver. The distracted state is a state in which an attentiveness for driving of the driver is impaired/distracted (i.e., an attentiveness for driving of the driver is lower than an attentiveness for driving of the driver when he/she is in a normal state).

The conventional apparatus starts generating a warning at a determination time point at which it determines that the driver has fallen into the distracted state. The conventional apparatus starts the deceleration control at a time point at which a predetermined reprieved time elapses from the determination time point. The conventional apparatus does not start (prohibits starting or cancel) the deceleration control, if a predetermined operation is performed in the reprieved time.

SUMMARY

According to the conventional apparatus, the deceleration control is started at a stage in which the driver is in the distracted state. Therefore, if there is a following vehicle that is behind the host vehicle in which the conventional apparatus is installed, there is a high possibility that the following vehicle rapidly comes closer to the host vehicle due to the deceleration control for the host vehicle, when the driver of the host vehicle is in the distracted state. In order to avoid the case in which the following vehicle rapidly comes closer to the host vehicle when the driver is in the distracted state, it is conceivable that the deceleration control is started when the driver has fallen into in the abnormality state.

However, when the driver is in the distracted state, there is a possibility that the host vehicle is accelerated if the deceleration control is not started. This acceleration may cause the driver of the host vehicle to feel uneasy when he/she has returned to the normal state.

In addition, according to the conventional apparatus, the deceleration control is suddenly started, when the driver has fallen into the distracted state while the host vehicle is accelerating. This causes a jerk of the host vehicle to rapidly change, and thus, may cause the driver of the host vehicle to feel uneasy.

The present disclosure is made to cope with the problems described above. That is, one of objectives of the present disclosure is to provide a vehicle control apparatus capable of decreasing a possibility that an inter-vehicle distance between the following vehicle and the host vehicle suddenly becomes shorter, and capable of preventing the host vehicle from accelerating, when the driver of the host vehicle is in the distracted state.

A vehicle control apparatus (hereinafter, referred to as a "present disclosure apparatus") according to the present disclosure comprises a control unit (20, 30, 40), which is capable of communicating with a driver's seat camera device (24) configured to obtain a driver's seat image by taking a picture of a driver sitting in a driver's seat of a vehicle, and which controls an acceleration and a deceleration of the vehicle.

The Control Unit is Configured to:
  perform an acceleration suppressing control to suppress an acceleration of the vehicle (step 1230: Yes, step 1240 to step 1250, step 1230 shown in FIG. 16: Yes, step 1240 shown in FIG. 16, step 1610, step 1250 shown in FIG. 16), when a distracted state detected based on the driver's seat image continues for a predetermined first time (step 645: No, step 675), the distracted state being a state in which an attentiveness for driving of the driver is impaired; and
  perform a deceleration control to decelerate the vehicle to stop the vehicle (step 1300 to step 1395), when the distracted state continues for a predetermined second time that is longer than the first time (step 720: No).

According to the present disclosure apparatus, the acceleration suppressing control is performed before the deceleration control is started. Therefore, the acceleration of the vehicle can be suppressed before the deceleration control is started. This can prevent the driver who returns to the normal state from the distracted state from feeling uneasy, since the acceleration of the vehicle is suppressed while he/she has been in the distracted state. In addition, the possibility that the inter-vehicle distance between the following vehicle and the (host) vehicle suddenly becomes shorter after the deceleration control is performed can be decreased.

Furthermore, since the deceleration control is performed after the acceleration suppressing control is performed, the possibility that the jerk of the vehicle rapidly changes can be decreased. Thus, the possibility that the driver feels uneasy due to the rapid change in the jerk can be decreased.

In some embodiments, the control unit is configured to:
  start a first alert notification for enhancing the attentiveness (step 660, step 665), when the distracted state continues for a predetermined first determination time (step 620: Yes, step 625); and
  determine that the distracted continues for the first time so as to start performing the acceleration suppressing control (step 1230: Yes, step 1240 to step 1250, step 1230 shown in FIG. 16: Yes, step 1240 shown in FIG. 16, step 1610, step 1250 shown in FIG. 16), when the distracted state continues for a predetermined second determination time from a start time point of the first alert notification (step 645: No, step 675).

According to the above aspect, the acceleration suppressing control is performed after the first alert notification is performed. This can decrease a possibility that the acceleration suppressing control is erroneously performed, because a possibility that it is determined that the driver is in the distracted state when the driver is actually in the normal state can be decreased.

In some embodiments, the control unit is configured to:
start a second alert notification for enhancing the attentiveness at a start time point of the acceleration suppressing control (step 735, step 740); and
determine that the distracted continues for the second time so as to start performing the deceleration control (step 1300 to step 1395), when the distracted state continues for a predetermined third determination time from a start time point of the second alert notification (step 720: No).

According to the above aspect, the deceleration control is started when the distracted state still continues after the second alert notification is performed. This can decrease a possibility that the deceleration control is erroneously performed when the driver is actually in the normal state.

In some embodiments, the control unit is configured to:
end the acceleration suppressing control (step 745) and start performing a jerk limiting control to control the vehicle in such a manner that a jerk that is a differential value of an acceleration of the vehicle with respect to time does not exceed a predetermined threshold (step 750, step 1245, step 1250, step 1255 to step 1270), when the driver is no longer in the distracted state before the distracted state continues for a predetermined third determination time from a start point of the acceleration suppressing control (step 730: Yes).

According to the above aspect, when the driver is no longer in the distracted state before the distracted state continues for the third determination time from the start point of the acceleration suppressing control, the acceleration suppressing control ends (is terminated). At this time, the jerk limiting control is started. Therefore, a sudden change in the jerk of the vehicle that would be otherwise caused by the termination of the acceleration suppressing control can be prevented.

In some embodiments, the control unit is configured to:
once starting the deceleration control, continue performing the deceleration control until a predetermined operation is performed even when the driver is no longer in the distracted state (step 825: Yes, step 920: Yes, step 1015: Yes, step 1020: Yes).

This can reduce a possibility that the deceleration control is terminated when it is erroneously determined that the driver has returned to the normal state.

In some embodiments, the present disclosure apparatus further comprises an object sensor (22, 23) which detects an object present in front of the vehicle.

The control unit is configured to:
perform the acceleration suppressing control (step 1230: Yes, step 1240 to step 1250, step 1230 shown in FIG. 12: Yes, step 1240 shown in FIG. 12, step 1610, step 1250 shown in FIG. 12), even before the distracted state continues for the first time (step 645 shown in FIG. 15: Yes), when a predetermined condition becomes satisfied (step 1515: Yes), the predetermined condition being a condition to be satisfied when a relationship between the object detected by the object sensor and the vehicle has changed, and thus, necessity of monitoring a surrounding of the vehicle by the driver is increased as compared to a state before the relationship has changed.

According to the above aspect, even before the distracted state continues for the first time, the acceleration suppressing control is performed when the predetermined condition becomes satisfied. The predetermined condition is the condition to be satisfied when the relationship between the object and the vehicle has changed, and thus, the necessity of monitoring the surrounding of the vehicle by the driver is increased as compared to the state before the relationship has changed. Therefore, the acceleration suppressing control can be performed at an appropriate timing in accordance with the surrounding in front of the vehicle.

In the above aspect, the control unit is configured to:
perform a constant speed control to cause an acceleration of the vehicle to coincide with a target acceleration that lets a speed of the vehicle become equal to a set vehicle speed (step 1140, step 1145), when the object sensor does not detect a forward vehicle traveling in front of the vehicle (step 1120: No);
perform an inter-vehicle-distance maintaining control to cause an acceleration of the vehicle to coincide with a target acceleration that maintains an inter vehicle distance to the forward vehicle at a set inter vehicle distance (step 1125 to step 1135), when the object sensor detects the forward vehicle (step 1120; Yes); and
perform the acceleration suppressing control, when the forward vehicle that has been detected by the object sensor is no longer detected (step 1515: Yes), and thus, determines that the predetermined condition becomes satisfied.

When the forward vehicle that has been detected by the object sensor is no longer detected, the control (for the vehicle) is changed from the inter-vehicle-distance maintaining control to the constant speed control. When the constant speed control is started in place of the inter-vehicle-distance maintaining control, the vehicle may be accelerated by the constant speed control. However, according to the above aspect, since it is determined that the predetermined condition becomes satisfied when the forward vehicle that has been detected by the object sensor is no longer detected, the acceleration suppressing control is started. Therefore, the vehicle can be prevented from being accelerated by the constant speed control, when the control is changed from the inter-vehicle-distance maintaining control to the constant speed control.

The vehicle (VA) comprises the above-described present disclosure apparatus.

An acceleration-and-deceleration control method according to the present disclosure comprises:
a first step of performing an acceleration suppressing control to suppress an acceleration of the vehicle (step 1230; Yes, step 1240 to step 1250, step 1230 shown in FIG. 12: Yes, step 1240 shown in FIG. 12, step 1610, step 1250 shown in FIG. 12), when a distracted state detected based on a driver's seat image obtained by a driver's seat camera device by taking a picture of the driver sitting in the driver's seat continues for a predetermined first time (step 645: No, step 675), the distracted state being a state in which an attentiveness for driving of the driver is impaired; and
a second step of performing a deceleration control to decelerate the vehicle to stop the vehicle (step 1300 to step 1395), when the distracted state continues for a predetermined second time that is longer than the first time (step 720: No).

A program storage device according to the present disclosure, readable by machine, storing a program for controlling an acceleration and a deceleration of a vehicle based on a state of a driver sitting in a driver's seat of the vehicle causes a computer to implement processes of:

a first step of performing an acceleration suppressing control to suppress an acceleration of the vehicle (step 1230; Yes, step 1240 to step 1250, step 1230 shown in FIG. 12: Yes, step 1240 shown in FIG. 12, step 1610, step 1250 shown in FIG. 12), when a distracted state detected based on a driver's seat image obtained by a driver's seat camera device by taking a picture of the driver sitting in the driver's seat continues for a predetermined first time (step 645: No, step 675), the distracted state being a state in which an attentiveness for driving of the driver is impaired; and a second step of performing a deceleration control to decelerate the vehicle to stop the vehicle (step 1300 to step 1395), when the distracted state continues for a predetermined second time that is longer than the first time (step 720: No).

According to the above-described method and the above-described program, the acceleration suppressing control is performed before the deceleration control is started. Therefore, the acceleration of the vehicle can be suppressed before the deceleration control is started. In addition, the possibility that the inter-vehicle distance between the following vehicle and the vehicle suddenly becomes shorter after the deceleration control is started can be decreased. Furthermore, since the deceleration control is performed after the acceleration suppressing control is performed, the possibility that the driver feels uneasy due to the rapid change in the jerk can be decreased.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure should not be limited to those in the embodiments defined by the names and/or the symbols.

DETAILED DESCRIPTION

<Configuration>

Figure 1:
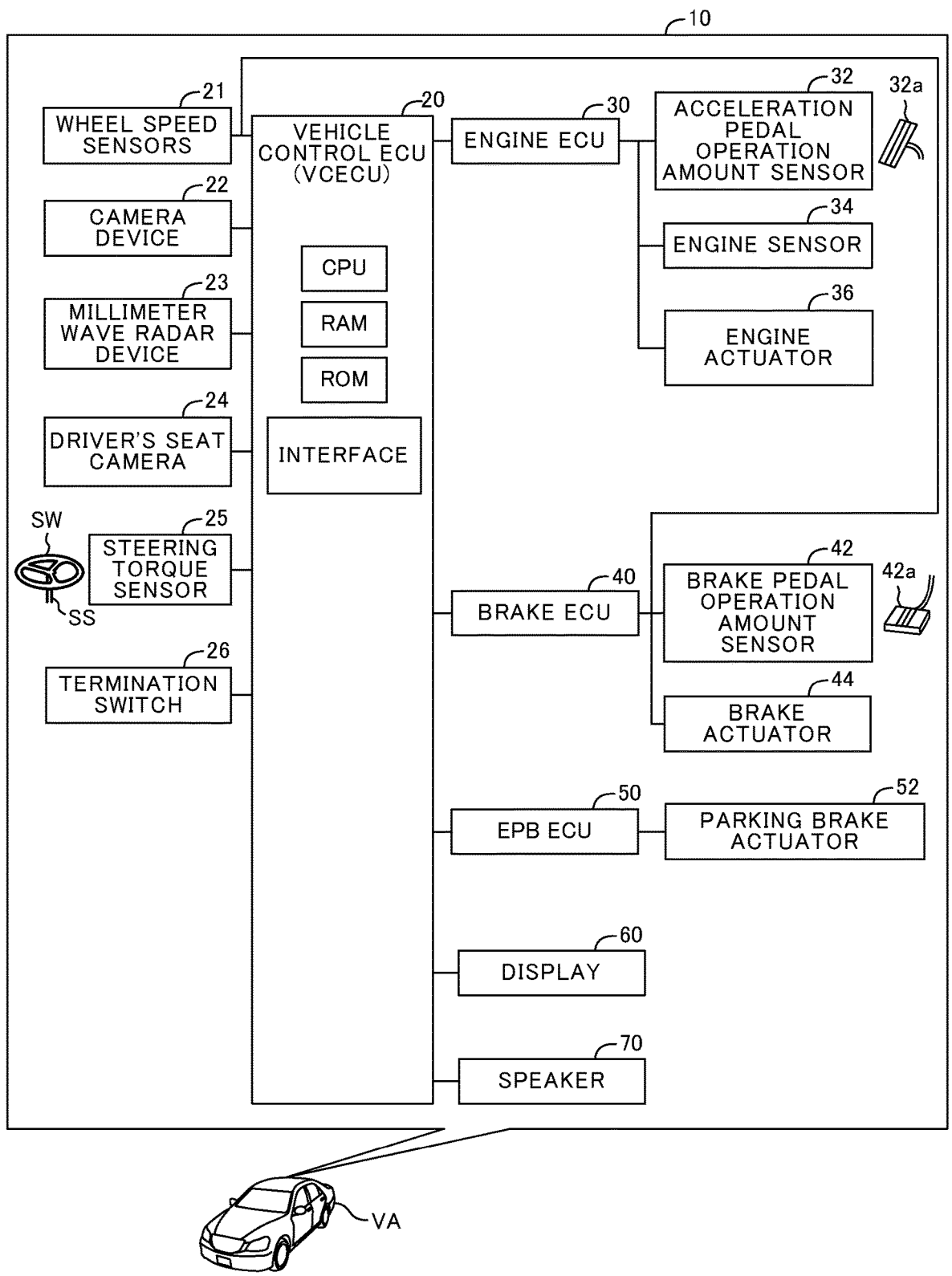
FIG. 1 is a schematic system diagram of a vehicle control apparatus according to an embodiment of the present disclosure.

As shown in FIG. 1, a vehicle control apparatus (hereinafter, referred to as a "present control apparatus") 10 according to an embodiment of the present disclosure is applied to (or installed in) a vehicle (i.e., a host vehicle) VA.

The present control apparatus 10 comprises a vehicle control ECU 20, an engine ECU 30, a brake ECU 40, and an EPB ECU (electric parking brake ECU) 50. Hereinafter, the vehicle control ECU 20 is referred to as a "VCECU 20".

Each of those ECUs is a control unit (an Electronic Control Unit) including a microcomputer as a main component, and may sometimes be referred to as a "controller". The microcomputer includes a CPU, a ROM, a RAM, and an interface (I/F). These ECUs are connected with each other so as to be able to mutually exchange data through a CAN (Controller Area Network). The CPU is configured and/or programmed to realize various functions by executing instructions (routines, or programs) stored in the ROM. Some or all of those ECUs may be integrated into a single ECU.

The present control apparatus 10 comprises wheel speed sensors 21, a camera device 22, a millimeter wave radar device 23, a driver's seat camera 24, a steering torque sensor 25, and a termination (cancel) switch 26. These are connected with the VCECU 20 so as to be able to mutually exchange data.

The wheel speed sensors 21 are provided to respective wheels of the vehicle VA. Each of the wheel speed sensors 21 generates one pulse signal when the corresponding wheel rotates by a predetermined angle. The VCECU 20 counts the number of the pulse signals from each of the wheel speed sensors 21 per unit time, and obtains a wheel rotational speed (or a wheel speed) of each of the wheels based on the counted number. The VCECU 20 obtains a vehicle speed Vs indicative of a moving speed of the vehicle VA based on the wheel rotational speeds of the wheels. For instance, the VCECU 20 obtains an average of the wheel speeds of four of the wheels as the vehicle speed Vs.

The camera device 22 is arranged at an upper part of a front windshield and inside a cabin of the vehicle VA, and obtains/captures an image (hereinafter, referred to as a "frontward image") of a frontward area in front of (or ahead of) the vehicle VA. The camera device 22 obtains, based on the frontward image, a distance to the object present in the frontward area, and a direction of that object. The camera device 22 transmits "camera object information including the thus obtained distance and the thus obtained direction" to the VCECU 20, every time a predetermined time elapses.

The millimeter wave radar device 23 radiates/transmits a millimeter wave to a frontward area of the vehicle VA. The millimeter wave radar device 23 is a well-known sensor for detecting an object by receiving a millimeter wave (reflected wave) that is reflected from (by) the object. The millimeter wave radar device 23 obtains/calculates, based on the received reflected wave, a distance (object distance) L to the object, a relative speed (object relative speed) Vr of the object with respect to the vehicle VA, and a direction of the object. The millimeter wave radar device 23 transmits "radar object information including the object distance L, the object relative speed Vr, and the direction of the object" to the VCECU 20, every time a predetermined time elapses.

The VCECU 20 specifies, based on the camera object information and the radar object information, a position of the object that is present in front of (ahead of) the vehicle VA.

The driver's seat camera 24 is arranged at a predetermined position in the vicinity of the steering wheel SW, and obtains a driver's seat image by capturing an image of (taking a picture of) an area in the vicinity of a face of a driver sitting in a driver's seat. The driver's seat camera 24 transmits the driver's seat image to the VCECU 20, every time a predetermined time elapses.

The steering torque sensor 25 detects a steering torque Tr acting on a steering shaft SS of the vehicle VA due to an operation to the steering wheel SW, and generates a detected signal indicative of the steering torque Tr. The VCECU 20 specifies the steering torque Tr by receiving the detected signal from the steering torque sensor 25.

The termination switch 26 is disposed in the vicinity of the steering wheel SW.

The engine ECU 30 is connected with an acceleration pedal operation amount sensor 32 and an engine sensor 34, and receives detected signals from those sensors.

The acceleration pedal operation amount sensor 32 detects an operation amount (i.e., an acceleration pedal operation amount AP) of an acceleration pedal 32a of the vehicle VA. When the driver does not operate the acceleration pedal 32a, the acceleration pedal operation amount AP is "0".

The engine sensor 34 is for detecting operating state amounts of an unillustrated "internal combustion engine serving as a driving source of the vehicle VA". The engine sensor 34 may include a throttle valve opening amount sensor, an engine rotational speed sensor, and an intake air amount sensor.

The engine ECU 30 is further connected with an engine actuator 36 that may be a throttle valve actuator, fuel injectors, or the like. The engine ECU 30 is configured to drive the engine actuator 36 to change a torque generated by the internal combustion engine so as to adjust a driving force of the vehicle VA.

The engine ECU 30 determines a target throttle valve opening TAtgt in such a manner that the target throttle valve opening TAtgt becomes greater as the acceleration pedal operation amount AP becomes greater. The engine ECU 30 drives the throttle valve actuator so as to make a throttle valve opening equal to the target throttle valve opening TAtgt.

The brake ECU 40 is connected with the wheel speed sensors 21 and a brake pedal operation amount sensor 42, and receives detected signals from those sensors.

The brake pedal operation amount sensor 42 detects an operation amount (i.e., a brake pedal operation amount BP) of a brake pedal 42a of the vehicle VA. When the driver does not operate the brake pedal 42a, the brake pedal operation amount BP is "0".

The brake ECU 40 is configured to obtain the vehicle speed Vs base on the wheel pulse signals from each of the wheel speed sensors 21, similarly to the VCECU 20. The brake ECU 40 may be configured to receive the vehicle speed Vs from the VCECU 20.

The brake ECU 40 is further connected with a brake actuator 44 that is a hydraulic control actuator. The brake actuator 44 is disposed in an unillustrated hydraulic circuit between an unillustrated master cylinder for pressurizing a hydraulic oil in accordance with a pedal force of the brake pedal 42a and unillustrated well-known friction brake devices including wheel cylinders provided at the respective wheels. The brake actuator 44 can adjust/change a pressure of the hydraulic oil supplied to the wheel cylinders so as to adjust/control a brake force of the vehicle VA.

The brake ECU 40 determines a target acceleration that is negative, based on the brake pedal operation amount BP. The brake ECU 40 drives the brake actuator 44 so as to make an actual acceleration of the vehicle VA equal to the target acceleration.

The EPB ECU 50 is connected with a parking brake actuator 52. The parking brake actuator 52 is an actuator for pressing a brake pad against a brake disc. Therefore, the EPB ECU 50 can apply a parking brake force to the wheels using the parking brake actuator 52 so as to hold the vehicle at a stopped state. Hereinafter, a brake of the vehicle VA caused by activating/operating the parking brake actuator 52 is referred to as an "EPB".

The present control apparatus 10 comprises a display 60 and a speaker 70. The display 60 and the speaker 70 is connected with the VCECU 20 so as to be able to mutually exchange data.

The display 60 is arranged at a certain position in the cabin of the vehicle VA so that the driver of the vehicle VA can visibly recognize (look at) the display 60. The speaker 70 is arranged at a certain position in the cabin of the vehicle VA and generates a warning sound.

(Outline of Operation)

The VECEU 20 obtains the driver's seat image from the driver's seat camera 24, every time a predetermined time elapses. The VECEU 20 determines whether or not the driver is in the distracted state, based on the driver's seat image. The distracted state is the state in which the attentiveness for driving of the driver is impaired. Examples of the distracted state include the following five states.

A looking aside state: a state where the driver does not look ahead (forward) or a road.

An eyes closed state: a state where the driver closes his/her eyes.

An inappropriate driving posture state: a state where a driving posture of the driver is inappropriate for driving.

A head lost state: a state where a head of the driver is not detected based on the driver's seat image (the head of the driver is not in the driver's seat image).

A drowsy state: a state where the driver feels sleepy/drowsy.

When a distracted condition is satisfied, the VCECU 20 performs an acceleration suppressing control to suppress/restrain an acceleration of the vehicle VA. The distracted condition is a condition to be satisfied when a "distracted case" in which the driver is in the distracted state continues for a predetermined time (hereinafter, referred to as a "first time"). The acceleration suppressing control is a control in which the VCECU 20 controls the engine actuator 36 via the engine ECU 30 in such a manner that an acceleration G in a front-rear direction of the vehicle VA does not become greater than "0". It should be noted that the acceleration G assumes a positive value for a frontward acceleration Gx of the vehicle VA.

The VCECU 20 determines that the driver is no longer in the distracted state and has fallen into the abnormality state (inappropriate state for driving), when the VCECU 20 determines, based on the driver's seat image, that the distracted case continues for a predetermined abnormality determination time (hereinafter, sometimes referred to as a "third determination time") after the time point at which the distracted condition becomes satisfied (i.e., after the time point at which the acceleration suppressing control is started). In other words, the VCECU 20 determines that the driver has fallen into the abnormality state, when the distracted state continues for a second time that is longer than the above-described first time. In this case, the VCECU 20 performs a deceleration control to decelerate the vehicle VA to stop the vehicle VA.

In this manner, the acceleration suppressing control is performed when the driver is in the distracted state before the driver is determined to have fallen into the abnormality state, and thereafter, the deceleration control is performed. Therefore, since the vehicle VA does not accelerate (or is not accelerated) before the deceleration control is started, a possibility that the inter-vehicle distance between the vehicle VA and the following vehicle rapidly becomes shorter immediately after the deceleration control is started can be decreased. In addition, since the vehicle VA does not accelerate while the driver is in the distracted state, a possibility that the driver feels uneasy when he/she returns to the normal state (from the distracted state) can also be decreased. Furthermore, since the acceleration suppressing control is performed before the deceleration control is started, a magnitude of a change in the jerk when the deceleration control is started is relatively small, and thus, a possibility that the driver feels uneasy due to the rapid change in the jerk when the deceleration control is started can also be decreased.

Example 1 of Operation

An example of operations of the present control apparatus 10 of when it is determined that the driver falls into the abnormality state after the driver is in the distracted state, without returning to the normal state, is described with reference to FIG. 2.

In the present embodiment, the VCECU 20 is configured to determine whether or not the above-described distracted condition becomes satisfied while the VCECU 20 is performing an ACC (Adaptive Cruise Control). The ACC includes two kinds of control, namely, a constant speed control and a trailing control (hereinafter, sometimes referred to as an "inter-vehicle-distance maintaining control").

The constant speed control is performed when a forward vehicle that is a vehicle traveling ahead of the vehicle VA is not present. The constant speed control is a control to cause the vehicle VA to travel/run while maintaining the vehicle speed Vs at a set vehicle speed Vset. More specifically, the VCECU 20 lets the vehicle VA travel so as to cause the acceleration G of the vehicle VA to coincide with (become equal to) a "target acceleration that is necessary for the vehicle speed Vs to coincide with the set vehicle speed Vset".

The trailing control is performed when the forward vehicle is present. The trailing control is a control to cause the vehicle VA to travel/run in such a manner that the vehicle VA follows the forward vehicle while maintaining the inter-vehicle distance D between the vehicle VA and the forward vehicle at a set inter-vehicle distance Dset. More specifically, the VCECU 20 lets the vehicle VA travel so as to cause the acceleration G to coincide with (become equal to) a "target acceleration that is necessary for the inter-vehicle distance D to coincide with the set inter-vehicle distance Dset".

The target acceleration used/obtained in the constant speed control or in the trailing control may be referred to as an "ACC target acceleration Gacc".

Under any of the constant speed control and the trailing control, the vehicle VA travels without requiring operations of the acceleration pedal 32a and the brake pedal 42a.

<Time Point t0>

At a time point t0, the VCECU 20 detects that the driver is in the distracted state.

<Time Point t1>

It is assumed that the VCECU 20 continues determining that the driver is in the distracted state, in a period from the time point t0 to a time point t1 at which a first determination time Td1 elapses from the time point to. At the time point t1, the VCECU 20 performs "a first alert notification for enhancing the driver's attentiveness" in order to cause the driver to return to the normal state from the distracted state. More specifically, the VCECU 20 causes the display 60 to display a first alert screen image 300 shown in FIG. 3A, and causes the speaker 70 to generate a warning sound in accordance with a first alert sound pattern.

Figure 3A:
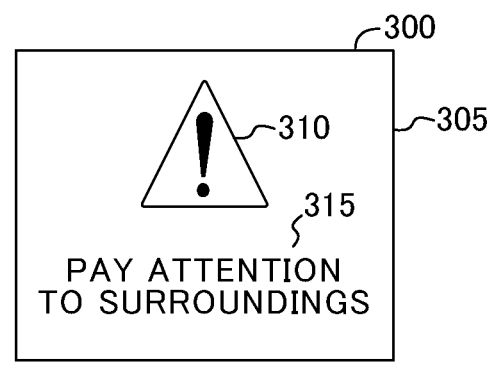
FIG. 3A is a drawing for describing a first alert screen image displayed on a display shown in FIG. 1.

As shown in FIG. 3A, the first alert screen image 300 includes an alert symbol 310 and a message 315, both enclosed in a predetermined frame 305. The background of the alert symbol 310 is yellow. The message 315 includes a statement for enhancing the driver's attentiveness, and, for example, is a message stating "Pay attention to surroundings".

The first alert sound pattern is a sound pattern for generating a warning sound of 800 Hz once (a single 800 Hz warning sound).

<Time Point t2>

It is assumed that the VCECU 20 continues determining that the driver is in the distracted state, in a period from the time point t1 to a time point t2 at which a second determination time Td2 elapses from the time point t1. At the time point t2, the VCECU 20 determines that the distracted condition becomes satisfied, and starts (performing) the acceleration suppressing control and a second alert notification. As the second alert notification, the VCECU 20 causes the display 60 to display a second alert screen image 350 shown in FIG. 3B, and causes the speaker 70 to generate a warning sound in accordance with a second alert sound pattern.

Figure 3B:
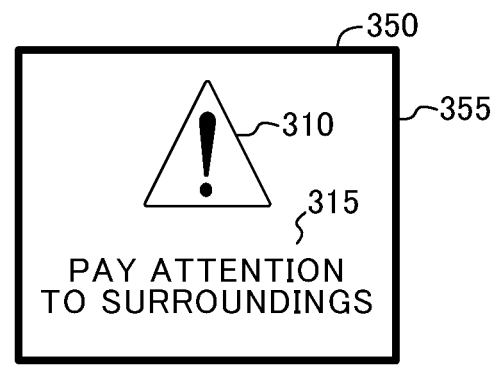
FIG. 3B is a drawing for describing a second alert screen image displayed on the display shown in FIG. 1.

As shown in FIG. 3B, the second alert screen image 350 includes the alert symbol 310 and the message 315, both enclosed in a predetermined frame 355. The frame 355 in the second alert screen image 350 is more intensified/highlighted as compared to the frame 305 in the first alert screen image 300. For example, the frame 355 is yellow, whereas the frame 305 is white. Therefore, a degree of warning for the driver by the second alert screen image 350 is greater than a degree of warning for the driver by the first alert screen image 300.

The second alert sound pattern is a sound pattern for repeatedly generating a warning sound of 800 Hz with a period of 0.7 second. Since the warning sound is repeatedly generated according to the second alert sound pattern, a degree of warning for the driver by the second alert sound pattern is greater than a degree of warning for the driver by the first alert sound pattern.

<Time Point t3>

It is assumed that the VCECU 20 continues determining that the driver is in the distracted state, in a period from the time point t2 to a time point t3 at which the abnormality determination time Tad elapses from the time point t2. At the time point t3, the VCECU 20 determines that the driver has fallen into the abnormality state, and starts (performing) the deceleration control and a first warning.

As the deceleration control, the VCECU 20 sequentially performs the following three controls.

mild deceleration control: a control to decelerate the vehicle VA at a predetermined negative first acceleration (i.e., first deceleration) for (over) a predetermined control time Ts.

stop deceleration control: a control to decelerate the vehicle VA at a predetermined negative second acceleration (i.e., second deceleration) until the vehicle VA stops.

stopped state holding control: a control to maintain a stopped state of the vehicle VA by activating the EPB so as to lock the wheels from a time point at which the vehicle VA has completely stopped.

The first acceleration is greater than the second acceleration. Namely, the vehicle VA under the mild deceleration control decelerates more moderately than the vehicle VA under the stop deceleration control.

At the time point t3, the VCECU 20 starts (performing) the mild deceleration control.

As the first warning, the VCECU 20 causes the display 60 to display a first warning screen image 400 shown in FIG. 3B, and causes the speaker 70 to generate a warning sound in accordance with a first warning sound pattern.

Figure 4A:
FIG. 4A is a drawing for describing a first warning screen image displayed on the display shown in FIG. 1.

As shown in FIG. 4A, the first warning screen image 400 includes a holding instruction illustration 405 and an operation for cancelling message 410.

The holding instruction illustration 405 is an illustration image for urging the driver to hold the steering wheel SW, and is red.

The operation for cancelling message 410 is a message for urging the driver to perform an operation to terminate/end the mild deceleration control (namely, a message for urging the driver to hold the steering wheel SW) and for notifying the driver that the stopped state holding control (stopping assistance function) will be started soon (in a short period of time).

Since the holding instruction illustration 405 is red, and the alert symbol shown in FIGS. 3A and 3B is yellow, a degree of warning for the driver by the first warning screen image 400 is greater than the degree of warning for the driver by the first alert screen image 300, and is greater than the degree of warning for the driver by the second alert screen image 350.

The first warning sound pattern is a sound pattern for repeatedly generating a warning sound of 1600 Hz with a period of 0.4 second. The frequency of the warning sound according to the first warning sound pattern is higher than the frequency of the warning sound according to the second alert sound pattern. The period of the warning sound according to the first warning sound pattern is shorter than the period of the warning sound according to the second alert sound pattern. Therefore, a degree of warning for the driver by the warning sound according to the first warning sound pattern is greater than the degree of warning for the driver by the warning sound according to the second alert sound pattern.

<Time Point t4>

At a time point t4 at which control time Ts elapses from the time point t3, the VCECU 20 starts (performing) the stop deceleration control and a second warning. As the second warning, the VCECU 20 causes the display 60 to display a second warning screen image 420 shown in FIG. 4B, and causes the speaker 70 to generate a warning sound in accordance with a second warning sound pattern.

Figure 4B:
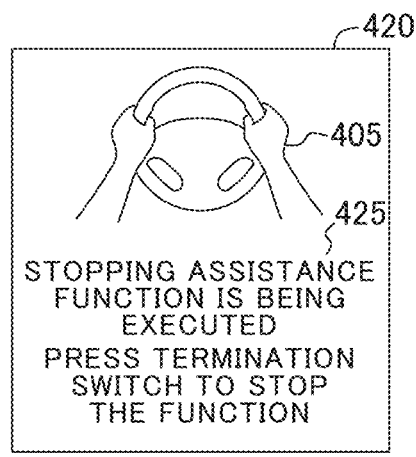
FIG. 4B is a drawing for describing a second warning screen image displayed on the display shown in FIG. 1.

As shown in FIG. 4B, the second warning screen image 420 includes the "holding instruction illustration 405 which is the same as the holding instruction illustration 405 included in the first warning screen image" and an operation for cancelling message 425.

The operation for cancelling message 425 is a message for notifying the driver that the stopping assistance function is being executed and that an operation onto the termination (cancel) switch 26 will stop/terminate the stopping assistance function.

It should be noted that the stopping assistance function means both of the stop deceleration control and the stopped state holding control.

The second warning sound pattern is a sound pattern for repeatedly generating a warning sound of 2400 Hz with a period of 0.2 second. The frequency of the warning sound according to the second warning sound pattern is higher than the frequency of the warning sound according to the first warning sound pattern. The period of the warning sound according to the second warning sound pattern is shorter than the period of the warning sound according to the first warning sound pattern. Therefore, a degree of warning for the driver by the warning sound according to the second warning sound pattern is greater than the degree of warning for the driver by the warning sound according to the first warning sound pattern.

<Time Point t5>

At a time point t5, the vehicle VA stops (namely, the vehicle speed Vs becomes equal to "0 km/h"). Thus, at the time point t5, the VCECU 20 starts (performing) the above-described stopped state holding control (a part of the stopping assistance function) and a third warning. As the third warning, the VCECU 20 causes the display 60 to display a third warning screen image 430 shown in FIG. 4C, and causes the speaker 70 to generate a warning sound in accordance with the above-described second warning sound pattern.

Figure 4C:
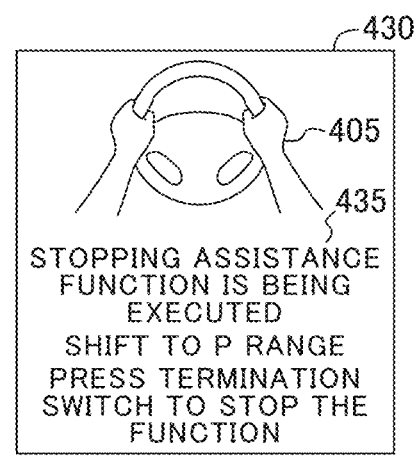
FIG. 4C is a drawing for describing a third warning screen image displayed on the display shown in FIG. 1.

As shown in FIG. 4C, the third warning screen image 430 includes the "holding instruction illustration 405 which is the same as the holding instruction illustration 405 included in the first warning screen image 400" and an operation for cancelling message 435.

The operation for cancelling message 435 is a message for notifying the driver that the stopping assistance function is being executed, that the driver is urged to switch a shift position to a parking range (P range), and that an operation onto the termination (cancel) switch 26 will stop the stopping assistance function.

In this manner, when the driver is in the distracted state over the second determination time Td2 while the first alert notification is being performed, the acceleration suppressing control and the second alert notification are performed. Therefore, the acceleration of the vehicle VA is suppressed (prevented) when it is determined that the driver is in the distracted state before it is determined that the driver has fallen into the abnormality state. In addition, the degree of warning by the second alert notification is greater than the degree of warning by the first alert notification. Therefore, a possibility to cause the driver to return (from the distracted state) to the normal state can be increased.

Example 2 of Operation

An example of operations of the present control apparatus 10 of when the driver returns to the normal state from the distracted state while the acceleration suppressing control is being performed is described with reference to FIG. 5.

Figure 5:
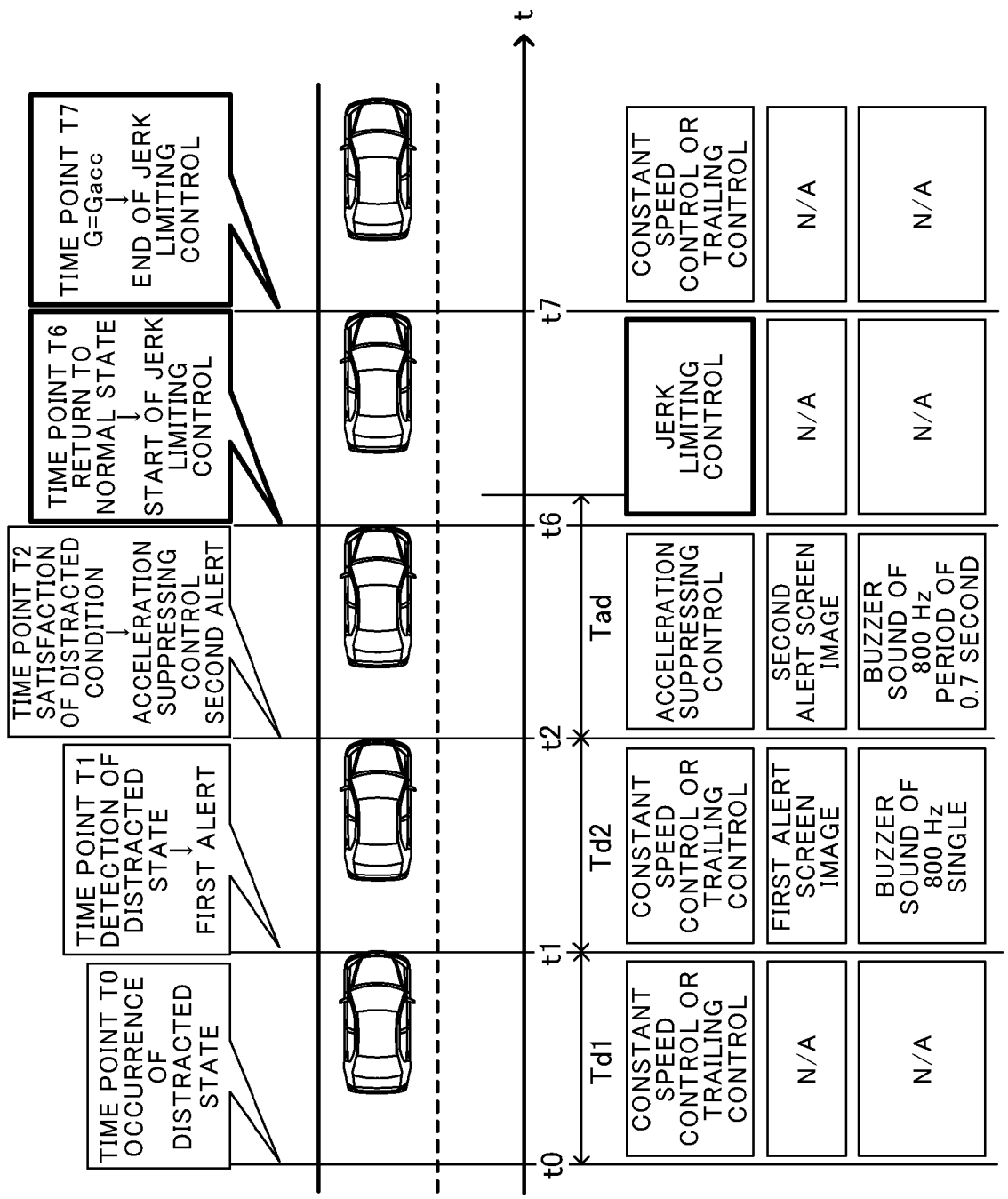
FIG. 5 is a drawing for describing an example of operations of the vehicle control apparatus according to the embodiment of the present disclosure, when a state of the driver returns from the distracted state to a normal state.

The time points t0, t1, and t2 shown in FIG. 5 are the same as the time points t0, t1, and t2 shown in FIG. 4, respectively. Similarly, to the example shown in FIG. 4, the VCECU 20 starts performing the acceleration suppressing control and the second alert notification at the time point t2 shown in FIG. 5.

In the example shown in FIG. 5, at a time point t6 before a time point at which the abnormality determination time Tad elapses from the time point t2, the VCECU 20 determines, based on the driver's seat image, that the driver is no longer in the distracted state (namely, determines that the driver has returned to the normal state). In this case, at the time point t6, the VCECU 20 starts (performing) a jerk limiting control and ends/terminates the second alert notification.

The jerk limiting control is a control to prohibit (restrain) the "jerk which is a differential value of the acceleration G of the vehicle VA with respect to time" from becoming greater than a predetermined value. More specifically, as the jerk limiting control, the VCECU 20 causes the acceleration G of the vehicle VA to coincide with (become equal to) an "acceleration Gjr that gradually becomes greater from "0" as an elapsed time from a start time point of the jerk limiting control becomes longer".

In a period from the time point t2 to the time point t6, the acceleration suppressing control is performed, and thus, the acceleration G of the vehicle VA does not become larger than "0". At the time point t6 at which the driver returns to the normal state, a sudden acceleration may be generated if the acceleration G is made to coincide with "the ACC target acceleration Gacc obtained/used in the constant speed control or the trailing control". Such a sudden acceleration may cause the driver to feel uneasy. In the present embodiment, however, the jerk limiting control is started at the time point t6, and therefore, the sudden acceleration immediately after the time point t6 can be prevented. Accordingly, a possibility that the driver feels uneasy can be decreased.

At a time point t7 at which the acceleration G coincides with the ACC target acceleration Gacc, the VCECU 20 ends the jerk limiting control. After the time point t7, the VCECU 20 lets the vehicle VA travel in such a manner that the acceleration G coincides with the ACC target acceleration Gacc (namely, the VCECU 20 performs the constant speed control or the trailing control).

(Specific Operation)

<First Alert Notification Routine>

The CPU of the VCECU 20 (hereinafter, the "CPU" means the CPU of the VCECU 20 unless otherwise specified) is configured or programmed to execute a first alert notification routine shown by a flowchart in FIG. 6 every time a predetermined time elapses.

Figure 6:
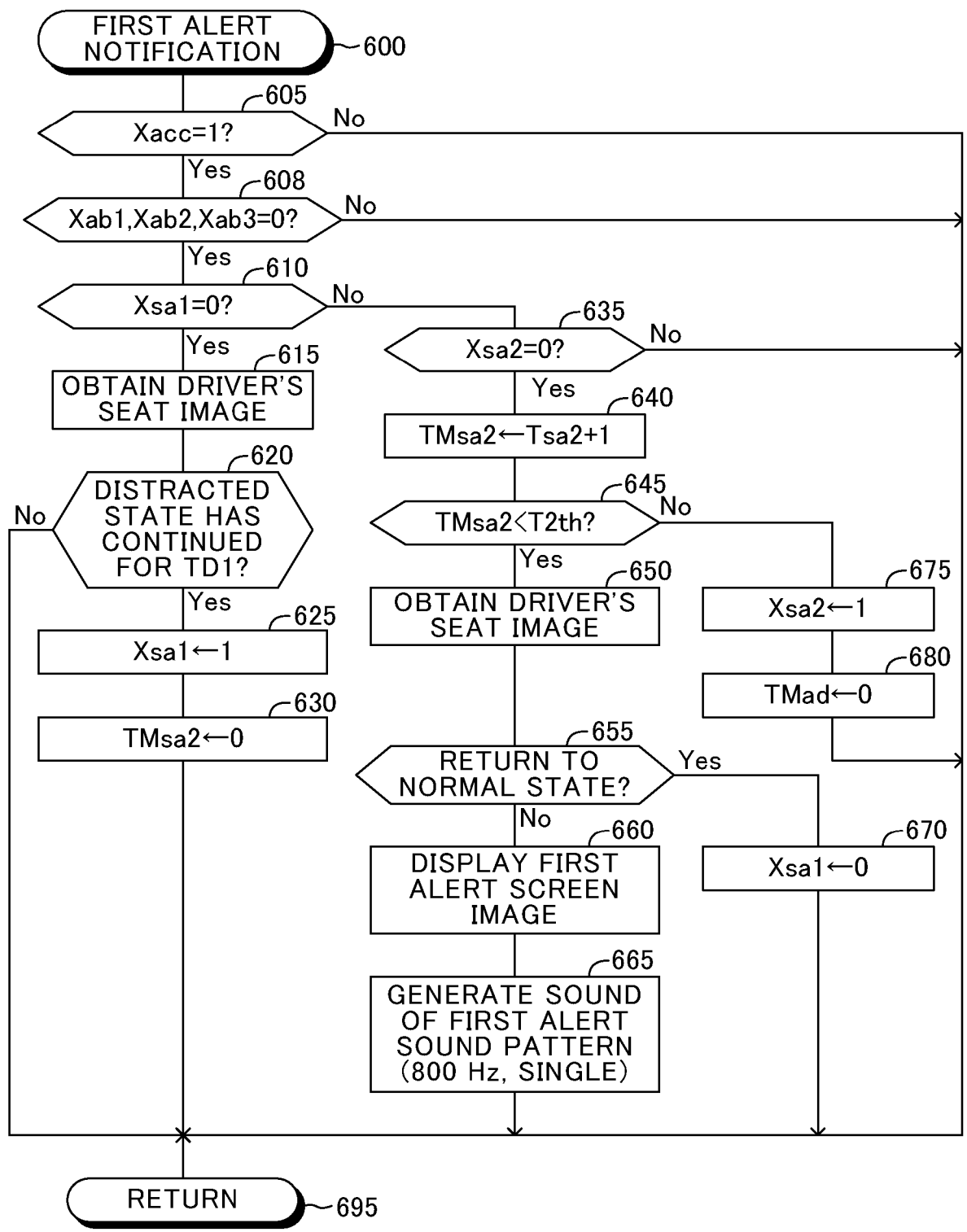
FIG. 6 is a flowchart illustrating a first alert notification routine executed by a CPU of a vehicle control ECU shown in FIG. 1.

When an appropriate time point comes, the CPU starts processing from step 600 in FIG. 6, and proceeds to step 605. At step 605, the CPU determines whether or not a value of an ACC flag Xacc is "1".

The value of the ACC flag Xacc is set to "1" when an ACC start condition becomes satisfied, and is set to "0" when an ACC end condition becomes satisfied. It should be noted that the value of the ACC flag Xacc is set to "0" through an initialization routine. The initialization routine is executed by the CPU when a position of an unillustrated ignition key switch is changed from an off position to an on position.

The ACC start condition is a condition to be satisfied when an unillustrated ACC start switch is operated.

The ACC end condition is a condition to be satisfied, when an unillustrated ACC end switch is operated, when the termination switch 26 is operated after (it is determined that) the driver has fallen into the abnormality state, or the like.

When the value of the ACC flag Xacc is "0", the CPU makes a "No" determination at step 605, and proceeds to step 695 to terminate the present routine tentatively.

Whereas, when the value of the ACC flag Xacc is "1", the CPU makes a "Yes" determination at step 605, and proceeds to step 608.

At step 608, the CPU determines whether or not all of values of a first warning flag Xab1, a second warning flag Xab2, and a third warning flag Xab3 are "0". The value of the first warning flag Xab1 is set to "1" when it is determined that the driver has fallen into the abnormality state, and set to "0" when the driver performs a predetermined termination operation (e.g., holding the steering wheel SW). It should be noted that the value of the first warning flag Xab1 is set to "0" through the initialization routine.

The value of the second warning flag Xab2 is set to "1" when the control time Ts has elapsed from the time point at which it was determined that the driver had fallen into the abnormality state, and set to "0" when the driver performs a predetermined termination operation (e.g., operation on the termination switch 26). It should be noted that the value of the second warning flag Xab2 is set to "0" through the initialization routine.

The value of the third warning flag Xab3 is set to "1" when the vehicle speed Vs has reached "0 km/h" (i.e., when the vehicle VA has stopped) due to the stop deceleration control, and set to "0" when the driver performs a predetermined termination operation (e.g., the operation on the termination switch 26 or an operation to switch the shift position to the P range). It should be noted that the value of the third warning flag Xab3 is set to "0" through the initialization routine.

When any one of the values of the first warning flag Xab1, the second warning flag Xab2, and the third warning flag Xab3 is "1", the CPU makes a "No" determination at step 608, and proceeds to step 695 to terminate the present routine tentatively.

Whereas, when all of the values of the first warning flag Xab1, the second warning flag Xab2, and the third warning flag Xab3 are "0", the CPU makes a "Yes" determination at step 608, and proceeds to step 610.

At step 610, the CPU determines whether or not a value of a first alert flag Xsa1 is "0".

The value of the first alert flag Xsa1 is set to "1" when the distracted case in which the driver is in the distracted state has continued over (for) the first determination time Td1, and set to "0" when the driver returns to the normal state. It should be noted that the value of the first alert flag Xsa1 is set to "0" through the initialization routine.

When the value of the first alert flag Xsa1 is set to "0", the CPU makes a "Yes" determination at step 610, and sequentially executes processes of step 615 and step 620.

Step 615: the CPU obtains the driver's seat image from the driver's seat camera 24.

Step 620: the CPU determines, based on the driver's seat image, whether or not the distracted case has continued over (for) the first determination time Td1. The distracted case is a state corresponding to at least one of the looking aside state, the eyes closed state, the inappropriate driving posture state, the head lost state, and the drowsy state (i.e., a state in which the driver is in the distracted state).

When the driver is not in the distracted state or when the distracted case has not yet continued over (for) the first determination time Td1, the CPU makes a "No" determination at step 620, and proceeds to step 695 to terminate the present routine tentatively.

Whereas, when the distracted condition has continued over (for) the first determination time Td1, the CPU makes a "Yes" determination at step 620, and sequentially executes processes of step 625 and step 630.

Step 625: the CPU sets the value of the first alert flag Xsa1 to "1".

Step 630: the CPU sets a value of a second determination time timer TMsa2 to "0".

The second determination time timer TMsa2 is a timer for measuring an elapsed time from a time point at which it is determined that the distracted state has continued over (for) the first determination time Td1 (i.e., from the time point at which the CPU makes a "Yes" determination at step 620).

Thereafter, the CPU proceeds to step 695 to terminate the present routine tentatively.

When the CPU proceeds to step 610 after the value of the first alert flag Xsa1 was set to "1", the CPU makes a "No" determination at step 610, and proceeds to step 635.

At step 635, the CPU determines whether or not a value of a second alert flag Xsa2 is "0".

The value of the second alert flag Xsa2 is set to "1" when the distracted condition becomes satisfied (namely, when the distracted case has continued over (for) the second determination time Td2 from the time point at which the distracted case had continued over (for) the first determination time Td1), and set to "0" when the driver returns to the normal state. It should be noted that the value of the second alert flag Xsa2 is set to "0" through the initialization routine.

When the value of the second alert flag Xsa2 is "0", the CPU makes a "Yes" determination at step 635, and sequentially executes processes of step 640 and step 645.

Step 640: the CPU increments the value of the second determination time timer TMsa2 by "1".

Step 645: the CPU determines whether or not the value of the second determination time timer TMsa2 is smaller than a second determination threshold T2th.

The second determination threshold T2th has been set to a value that the second determination time timer TMsa2 reaches, when the second determination time Td2 elapses from the time point at which the distracted case has continued over (for) the first determination time Td1.

When the value of the second determination time timer TMsa2 is smaller than the second determination threshold T2th, the CPU makes a "Yes" determination at step 645, and sequentially executes processes of step 650 and step 655.

Step 650: the CPU obtains the driver's seat image from the driver's seat camera 24.

Step 655: the CPU determines, based on the driver's seat image, whether or not the driver has returned to the normal state.

More specifically, the CPU determines that the driver returns to the normal state when it is determined, based on the driver's seat image, that the driver is no longer in any one of the looking aside state, the eyes closed state, the inappropriate driving posture state, the head lost state, and the drowsy state.

When the driver has not returned to the normal state, the CPU makes a "No" determination at step 655, and sequentially executes processes of step 660 and step 665.

Step 660: the CPU causes the display 60 to display the first alert screen image 300.

Step 665: the CPU causes the speaker 70 to generate the warning sound in accordance with the first alert sound pattern.

Thereafter, the CPU proceeds to step 695 to terminate the present routine tentatively.

Whereas, if the driver has returned to the normal state when the CPU proceeds to step 655, the CPU makes a "Yes" determination at step 655, and proceeds to step 670. At step 670, the CPU sets the value of the first alert flag Xsa1 to "0". Thereafter, the CPU proceeds to step 695 to terminate the present routine tentatively.

On the other hand, if the value of the second determination time timer TMsa2 is equal to or greater than the second determination threshold T2th when the CPU proceeds to step 645, the CPU makes a "No" determination at step 645, and sequentially executes processes of step 675 and step 680.

Step 675: the CPU sets the value of the second alert flag Xsa2 to "1".

Step 680: the CPU sets a value of an abnormality determination time timer TMad to "0".

The abnormality determination time timer TMad is a timer for measuring an elapsed time from a time point at which the distracted condition becomes satisfied (i.e., from the time point at which the CPU makes a "No" determination at step 645).

Thereafter, the CPU proceeds to step 695 to terminate the present routine tentatively.

<Second Alert Notification Routine>

Figure 7:
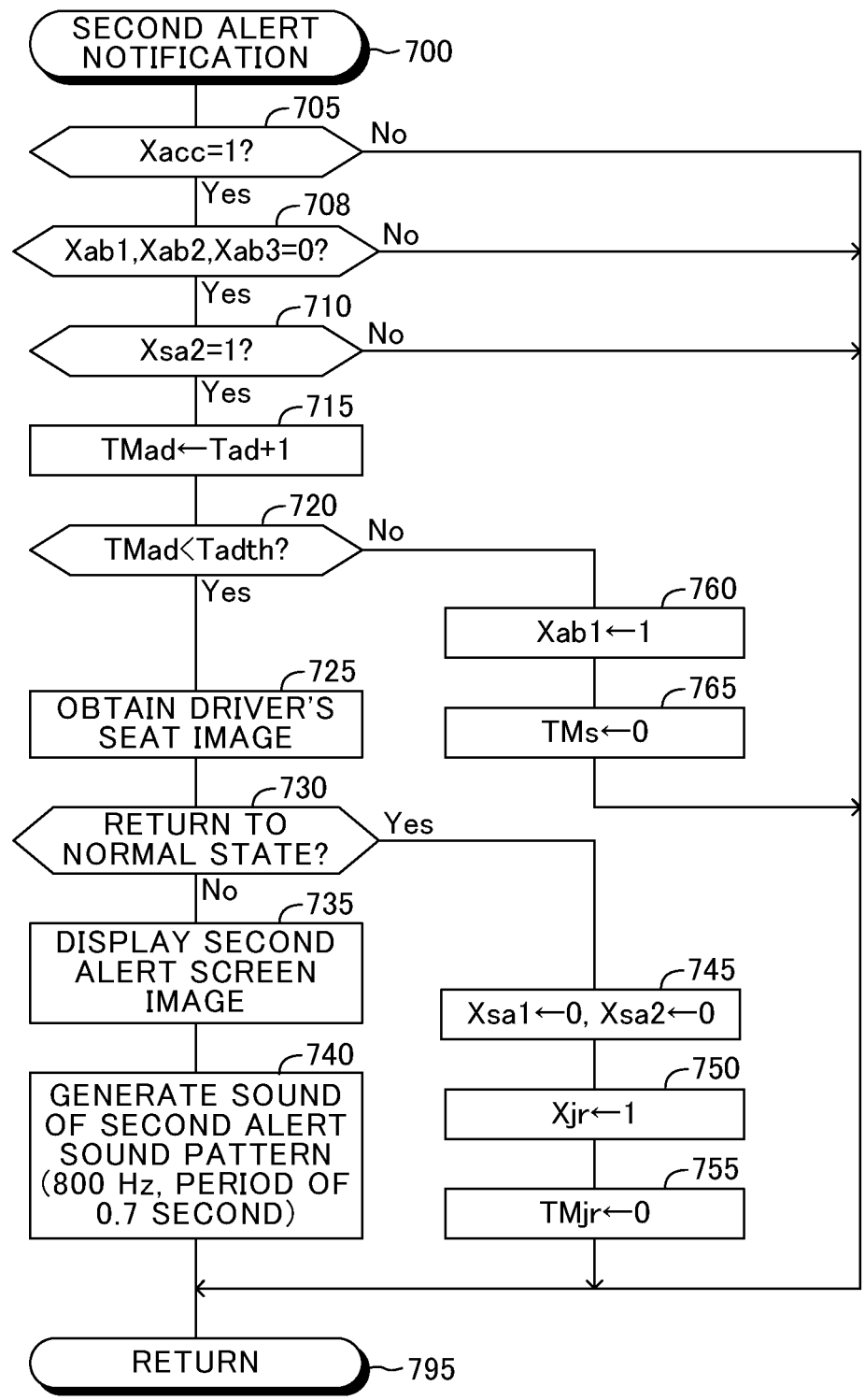
FIG. 7 is a flowchart illustrating a second alert notification routine executed by the CPU of the vehicle control ECU shown in FIG. 1.

The CPU is configured or programmed to execute a second alert notification routine shown by a flowchart in FIG. 7 every time a predetermined time elapses.

When an appropriate time point comes, the CPU starts processing from step 700 in FIG. 7, and proceeds to step 705. At step 705, the CPU determines whether or not the value of the ACC flag Xacc is "1".

When the value of the ACC flag Xacc is "0", the CPU makes a "No" determination at step 705, and proceeds to step 795 to terminate the present routine tentatively.

Whereas, when the value of the ACC flag Xacc is "1", the CPU makes a "Yes" determination at step 705, and proceeds to step 708.

At step 708, the CPU determines whether or not all of the values of the first warning flag Xab1, the second warning flag Xab2, and the third warning flag Xab3 are "0".

When any one of the values of the first warning flag Xab1, the second warning flag Xab2, and the third warning flag Xab3 is "1", the CPU makes a "No" determination at step 708, and proceeds to step 795 to terminate the present routine tentatively.

Whereas, when all of the values of the first warning flag Xab1, the second warning flag Xab2, and the third warning flag Xab3 are "0", the CPU makes a "Yes" determination at step 708, and proceeds to step 710.

At step 710, the CPU determines whether or not the value of the second alert flag Xsa2 is "1".

When the value of the second alert flag Xsa2 is "0", the CPU makes a "No" determination at step 710, and proceeds to step 795 to terminate the present routine tentatively.

Whereas, when the value of the second alert flag Xsa2 is "1", the CPU makes a "Yes" determination at step 710, and sequentially executes processes of step 715 and step 720.

Step 715: the CPU increments the value of the abnormality determination time timer TMad by "1".

Step 720: the CPU determines whether or not the value of the abnormality determination time timer TMad is smaller than an abnormality determination threshold Tadth.

The abnormality determination threshold Tadth has been set to a value that the abnormality determination time timer TMad reaches when the abnormality determination time Tad elapses from the time point at which the distracted condition becomes satisfied.

When the value of the abnormality determination time timer TMad is smaller than the abnormality determination threshold Tadth, the CPU makes a "Yes" determination at step 720, and sequentially executes processes of step 725 and step 730.

Step 725: the CPU obtains the driver's seat image from the driver's seat camera 24.

Step 730: the CPU determines, based on the driver's seat image, whether or not the driver has returned to the normal state.

When the driver has not returned to the normal state, the CPU makes a "No" determination at step 730, and sequentially executes processes of step 735 and step 740.

Step 735: the CPU causes the display 60 to display the second alert screen image 350.

Step 740: the CPU causes the speaker 70 to generate the warning sound in accordance with the second alert sound pattern.

Thereafter, the CPU proceeds to step 795 to terminate the present routine tentatively.

Whereas, when the driver has returned to the normal state, the CPU makes a "Yes" determination at step 730, and sequentially executes processes of step 745 to step 755.

Step 745: the CPU sets the values of the first alert flag Xsa1 and the second alert flag Xsa2 to "0".

Step 750: the CPU sets a value of a jerk limiting control flag Xjr to "1".

The value of the jerk limiting control flag Xjr is set to "1" when the jerk limiting control is started, and set to "0" when the jerk limiting control is ended/terminated. It should be noted that the value of the jerk limiting control flag Xjr is set to "0" through the initialization routine.

Step 755: the CPU sets a value of a limiting timer TMjr to "0".

The limiting timer TMjr is a timer for measuring an elapsed time from a time point at which the jerk limiting control is started.

Thereafter, the CPU proceeds to step 795 to terminate the present routine tentatively.

On the other hand, if the value of the abnormality determination time timer TMad is equal to or greater than the abnormality determination threshold Tadth when the CPU proceeds to step 720, the CPU determines that the driver has fallen into the abnormality state. In this case, the CPU makes a "No" determination at step 720, and sequentially executes processes of step 760 and step 765.

Step 760: the CPU sets the value of the first warning flag Xab1 to "1".

Step 765: the CPU sets a value of a mild deceleration timer TMs to "0".

The mild deceleration timer TMs is a timer for measuring an elapsed time from a time point at which it is determined that the driver has fallen into the abnormality state (i.e., from a start time point at which the mild deceleration control is started).

Thereafter, the CPU proceeds to step 795 to terminate the present routine tentatively.

<First Warning Routine>

Figure 8:
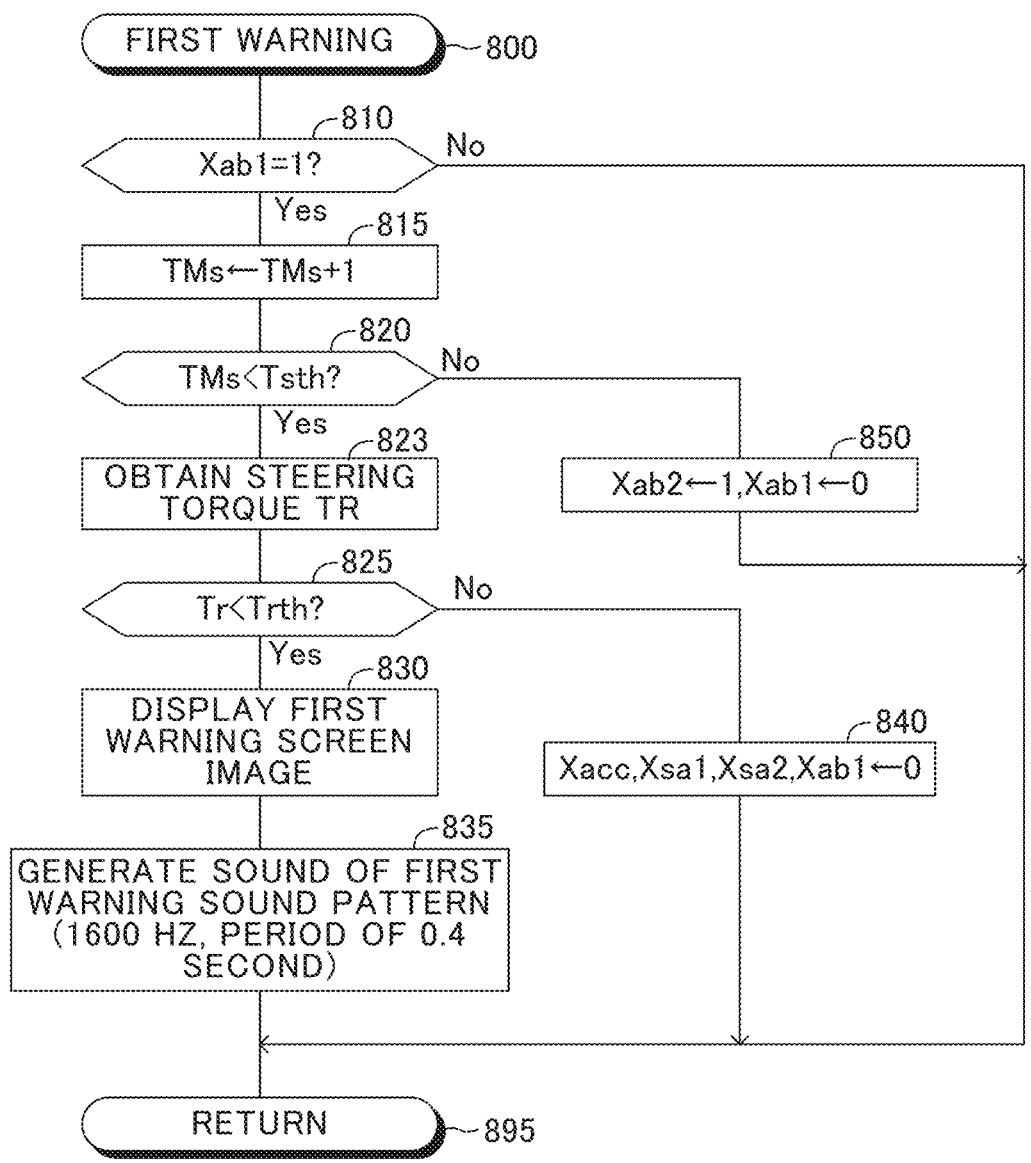
FIG. 8 is a flowchart illustrating a first warning routine executed by the CPU of the vehicle control ECU shown in FIG. 1.

The CPU is configured or programmed to execute a first warning routine shown by a flowchart in FIG. 8 every time a predetermined time elapses.

When an appropriate time point comes, the CPU starts processing from step 800 in FIG. 8, and proceeds to step 810. At step 810, the CPU determines whether or not the value of the first warning flag Xab1 is "1".

When the value of the first warning flag Xab1 is "0", the CPU makes a "No" determination at step 810, and proceeds to step 895 to terminate the present routine tentatively.

Whereas, when the value of the first warning flag Xab1 is "1", the CPU makes a "Yes" determination at step 810, and sequentially executes processes of step 815 and step 820.

Step 815: the CPU increments the value of the mild deceleration timer TMs by "1".

Step 820: the CPU determines whether or not the value of the mild deceleration timer TMs is smaller than a control threshold Tsth.

The control threshold Tsth has been set to a value that mild deceleration timer TMs reaches, when the control time Ts elapses from the time point at which it is determined that the driver has fallen into the abnormality state.

When the value of the mild deceleration timer TMs is smaller than the control threshold Tsth, the CPU makes a "Yes" determination at step 820, and sequentially executes processes of step 823 and step 825.

Step 823: the CPU obtains the steering torque Tr based on the detected signal of the steering torque sensor 25.

Step 825: the CPU determines whether or not the steering torque Tr is smaller than a torque threshold Trth.

When the steering torque Tr is smaller than the torque threshold Trth, the CPU determines that the driver is not holding the steering wheel SW. In this case, the CPU makes a "Yes" determination at step 825, and sequentially executes processes of step 830 and step 835.

Step 830: the CPU causes the display 60 to display the first warning screen image 400.

Step 835: the CPU causes the speaker 70 to generate the warning sound in accordance with the first warning sound pattern.

Thereafter, the CPU proceeds to step 895 to terminate the present routine tentatively.

Whereas, when the steering torque Tr is equal to or greater than the torque threshold Trth, the CPU makes a "No" determination at step 825, and proceeds to step 840. At step 840, the CPU sets all of the values of the ACC flag Xacc, the first alert flag Xsa1, the second alert flag Xsa2, and the first warning flag Xab1 to "0". Thereafter, the CPU proceeds to step 895 to terminate the present routine tentatively.

On the other hand, if the value of the mild deceleration timer TMs is equal to or greater than the control threshold Tsth when the CPU proceeds to step 820, the CPU makes a "No" determination at step 820, and proceeds to step 850. At step 850, the CPU sets the value of the second warning flag Xab2 to "1", and sets the value of the first warning flag Xab1 to "0". Thereafter, the CPU proceeds to step 895 to terminate the present routine tentatively.

<Second Warning Routine>

Figure 9:
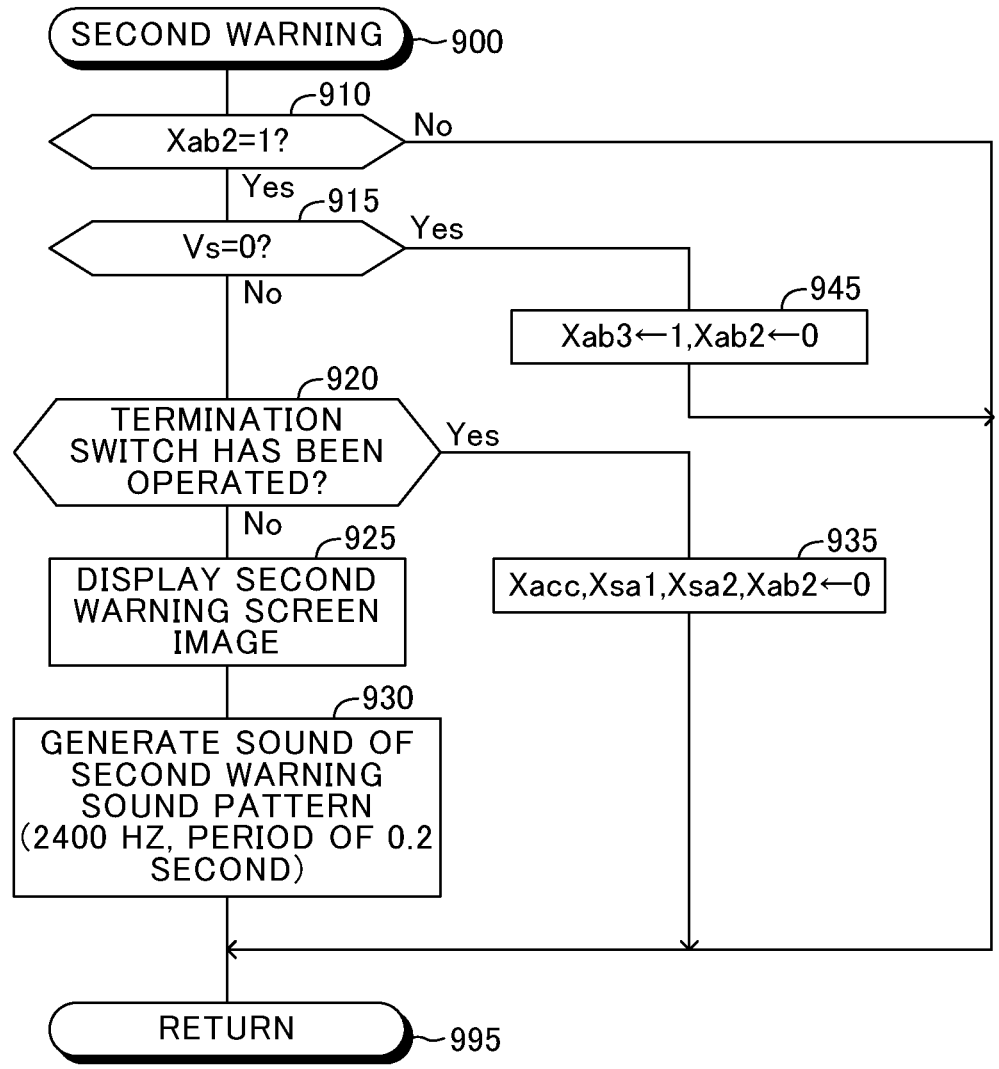
FIG. 9 is a flowchart illustrating a second warning routine executed by the CPU of the vehicle control ECU shown in FIG. 1.

The CPU is configured or programmed to execute a second warning routine shown by a flowchart in FIG. 9 every time a predetermined time elapses.

When an appropriate time point comes, the CPU starts processing from step 900 in FIG. 9, and proceeds to step 910. At step 910, the CPU determines whether or not the value of the second warning flag Xab2 is "1".

When the value of the second warning flag Xab2 is "0", the CPU makes a "No" determination at step 910, and proceeds to step 995 to terminate the present routine tentatively.

Whereas, when the value of the second warning flag Xab2 is "1", the CPU makes a "Yes" determination at step 910, and proceeds to step 915.

At step 915, the CPU determines whether or not the vehicle speed Vs is "0 km/h".

When the vehicle speed Vs is not "0 km/h", the CPU makes a "No" determination at step 915, and proceeds to step 920. At step 920, the CPU determines whether or not the termination switch 26 has been operated.

When the termination switch 26 has not been operated, the CPU makes a "No" determination at step 920, and sequentially executes processes of step 925 and step 930.

Step 925: the CPU causes the display 60 to display the second warning screen image 420.

Step 930: the CPU causes the speaker 70 to generate the warning sound in accordance with the second warning sound pattern.

Thereafter, the CPU proceeds to step 995 to terminate the present routine tentatively.

On the other hand, when the termination switch 26 has been operated, the CPU makes a "Yes" determination at step 920, and proceeds to step 935. At step 935, the CPU sets all of the values of the ACC flag Xacc, the first alert flag Xsa1, the second alert flag Xsa2, and the second warning flag Xab2 to "0". Thereafter, the CPU proceeds to step 995 to terminate the present routine tentatively.

If the vehicle speed Vs is "0 km/h" when the CPU proceeds to step 915, the CPU makes a "Yes" determination at step 915, and proceeds to step 945. At step 945, the CPU sets the value of the third warning flag Xab3 to "1", and sets the value of the second warning flag Xab2 to "0". Thereafter, the CPU proceeds to step 995 to terminate the present routine tentatively.

<Third Warning Routine>

Figure 10:
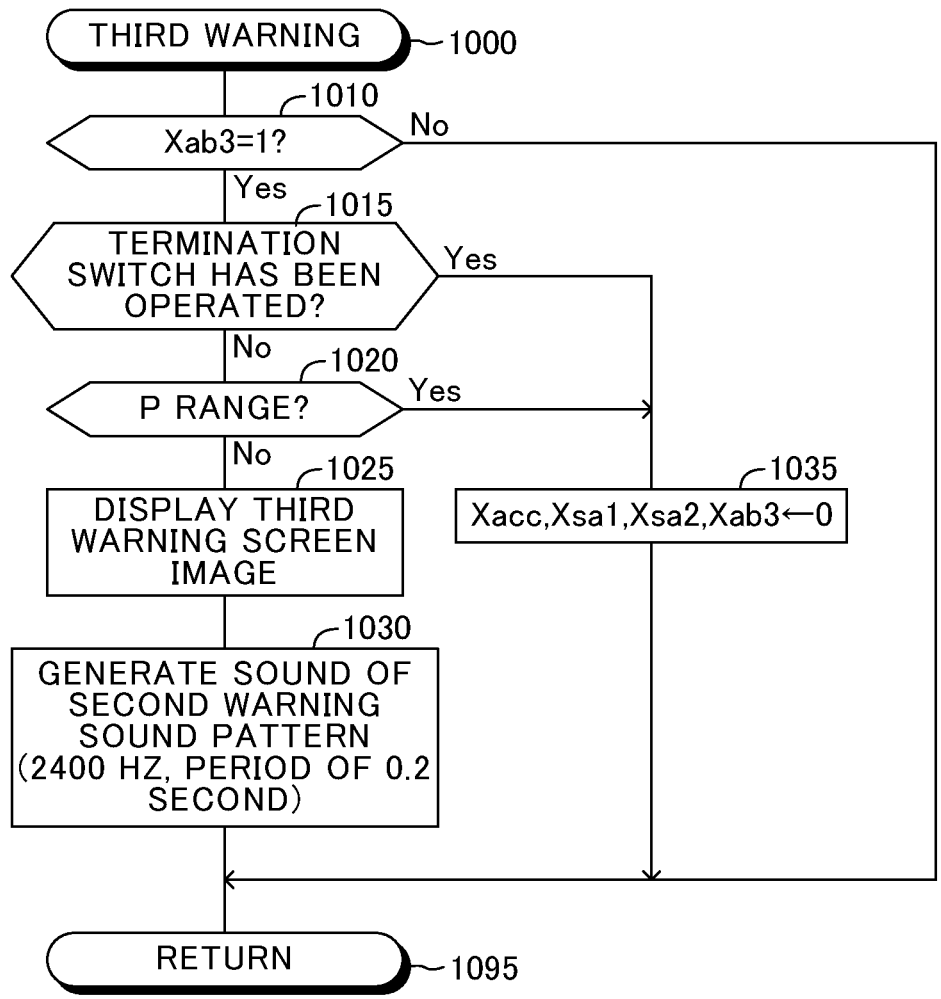
FIG. 10 is a flowchart illustrating a third warning routine executed by the CPU of the vehicle control ECU shown in FIG. 1.

The CPU is configured or programmed to execute a third warning routine shown by a flowchart in FIG. 10 every time a predetermined time elapses.

When an appropriate time point comes, the CPU starts processing from step 1000 in FIG. 10, and proceeds to step 1010. At step 1010, the CPU determines whether or not the value of the third warning flag Xab3 is "1".

When the value of the third warning flag Xab3 is "0", the CPU makes a "No" determination at step 1010, and proceeds to step 1095 to terminate the present routine tentatively.

Whereas, when the value of the third warning flag Xab3 is "1", the CPU makes a "Yes" determination at step 1010, and proceeds to step 1015. At step 1015, the CPU determines whether or not the termination switch 26 has been operated.

When the termination switch 26 has not been operated, the CPU makes a "No" determination at step 1015, and proceeds to step 1020. At step 1020, the CPU determines whether or not the shift position has been switched into the P range.

If the shift position has not been switched into the P range, the CPU makes a "No" determination at step 1020, and sequentially executes processes of step 1025 and step 1030.

Step 1025: the CPU causes the display 60 to display the third warning screen image 430.

Step 1030: the CPU causes the speaker 70 to generate the warning sound in accordance with the second warning sound pattern.

Thereafter, the CPU proceeds to step 1095 to terminate the present routine tentatively.

If the termination switch 26 has been operated when the CPU proceeds to step 1015, the CPU makes a "Yes" determination at step 1015, and proceeds to step 1035. At step 1035, the CPU sets all of the values of the ACC flag Xacc, the first alert flag Xsa1, the second alert flag Xsa2, and the third warning flag Xab3 to "0". Thereafter, the CPU proceeds to step 1095 to terminate the present routine tentatively.

If the shift position has been switched into the P range when the CPU proceeds to step 1020, the CPU makes a "Yes" determination at step 1020, and executes the process of step 1035. Thereafter, the CPU proceeds to step 1095 to terminate the present routine tentatively.

<ACC Routine>

Figure 11:
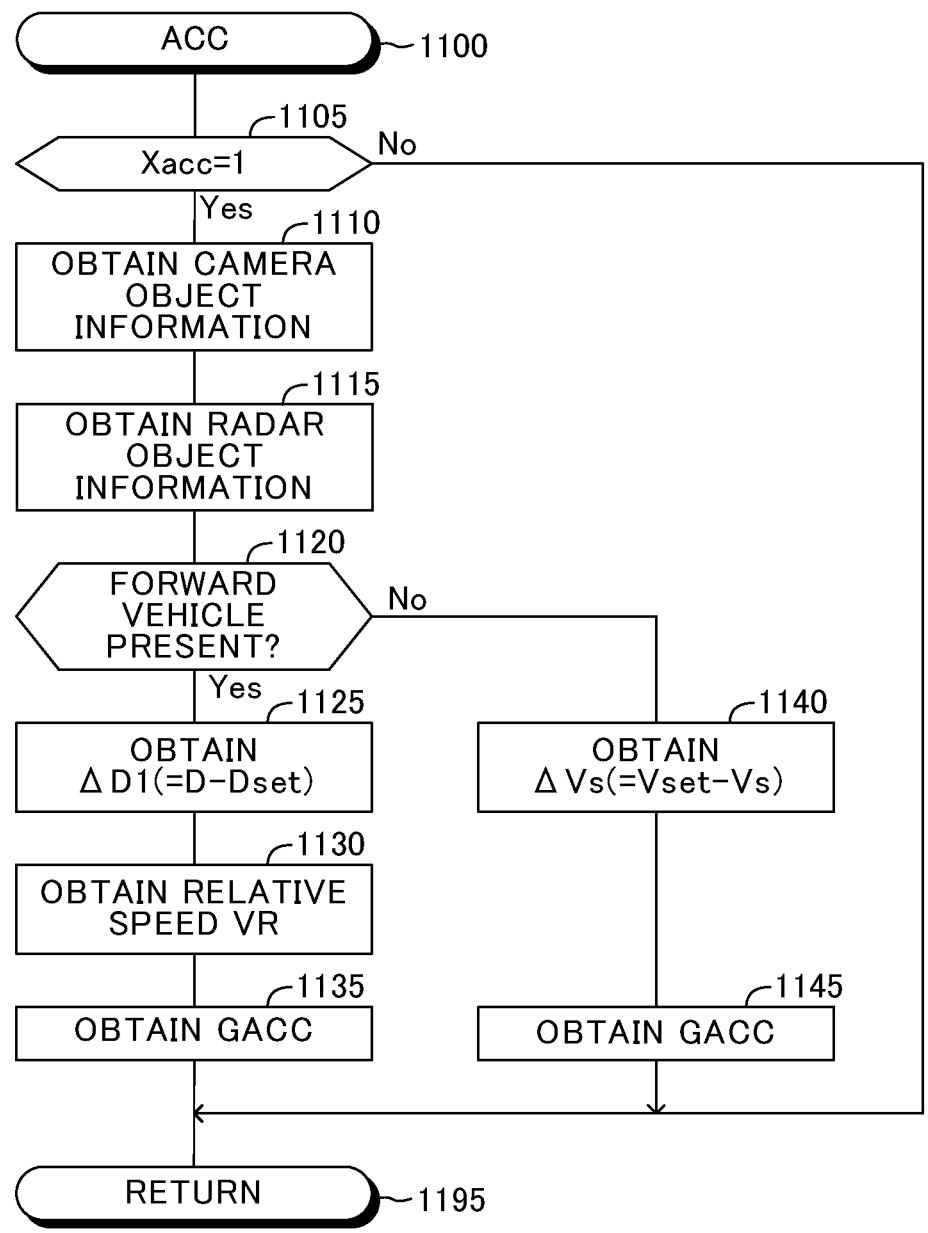
FIG. 11 is a flowchart illustrating an ACC routine executed by the CPU of the vehicle control ECU shown in FIG. 1.

The CPU is configured or programmed to execute an ACC routine shown by a flowchart in FIG. 11 every time a predetermined time elapses.

When an appropriate time point comes, the CPU starts processing from step 1100 in FIG. 11, and proceeds to step 1105. At step 1105, the CPU determines whether or not the value of the ACC flag Xacc is "1".

When the value of the ACC flag Xacc is "0", the CPU makes a "No" determination at step 1105, and proceeds to step 1195 to terminate the present routine tentatively.

Whereas, when the value of the ACC flag Xacc is "1", the CPU makes a "Yes" determination at step 1105, and sequentially executes processes of step 1110 to step 1120.

Step 1110: the CPU obtains the camera object information from the camera device 22.

Step 1115: the CPU obtains the radar object information from the millimeter wave radar device 23.

Step 1120: the CPU determines, based on the camera object information and the radar object information, whether or not the forward vehicle is present.

When the forward vehicle is present, the CPU makes a "Yes" determination at step 1120, and sequentially executes processes of step 1125 to step 1135.

Step 1125: the CPU obtains an inter-vehicle difference ΔD1 by subtracting the set inter-vehicle distance Dset from the inter-vehicle distance D between the vehicle VA and the forward vehicle.

Step 1130: the CPU obtains the relative speed Vr of the forward vehicle with respect to the vehicle VA, based on the relative speed included in the radar object information.

Step 1135: the CPU obtains the ACC target acceleration Gacc by applying the inter-vehicle difference ΔD1 and the relative speed Vr to the following expression (1).

$$Gacc = Ka1 \cdot (k1 \cdot \Delta D1 + k2 \cdot Vr) \quad (1)$$

Each of Ka1, k1, and k2 in the expression (1) is a predetermined positive gain (coefficient).

Thereafter, the CPU proceeds to step 1195 to terminate the present routine tentatively.

Whereas, if the forward vehicle is not present when the CPU proceeds to step 1120, the CPU makes a "No" determination at step 1120, and sequentially executes processes of step 1140 and step 1145.

Step 1140: the CPU obtains a vehicle speed difference ΔVs by subtracting the vehicle speed Vs from the set vehicle speed Vset.

Step 1145: the CPU obtains the ACC target acceleration Gacc by applying the vehicle speed difference ΔVs to the following expression (2).

$$Gacc = k3 \cdot \Delta Vs \quad (2)$$

k3 in the expression (2) is a predetermined gain (coefficient).

Thereafter, the CPU proceeds to step 1195 to terminate the present routine tentatively.

<ACC Acceleration Setting Routine>

Figure 12:
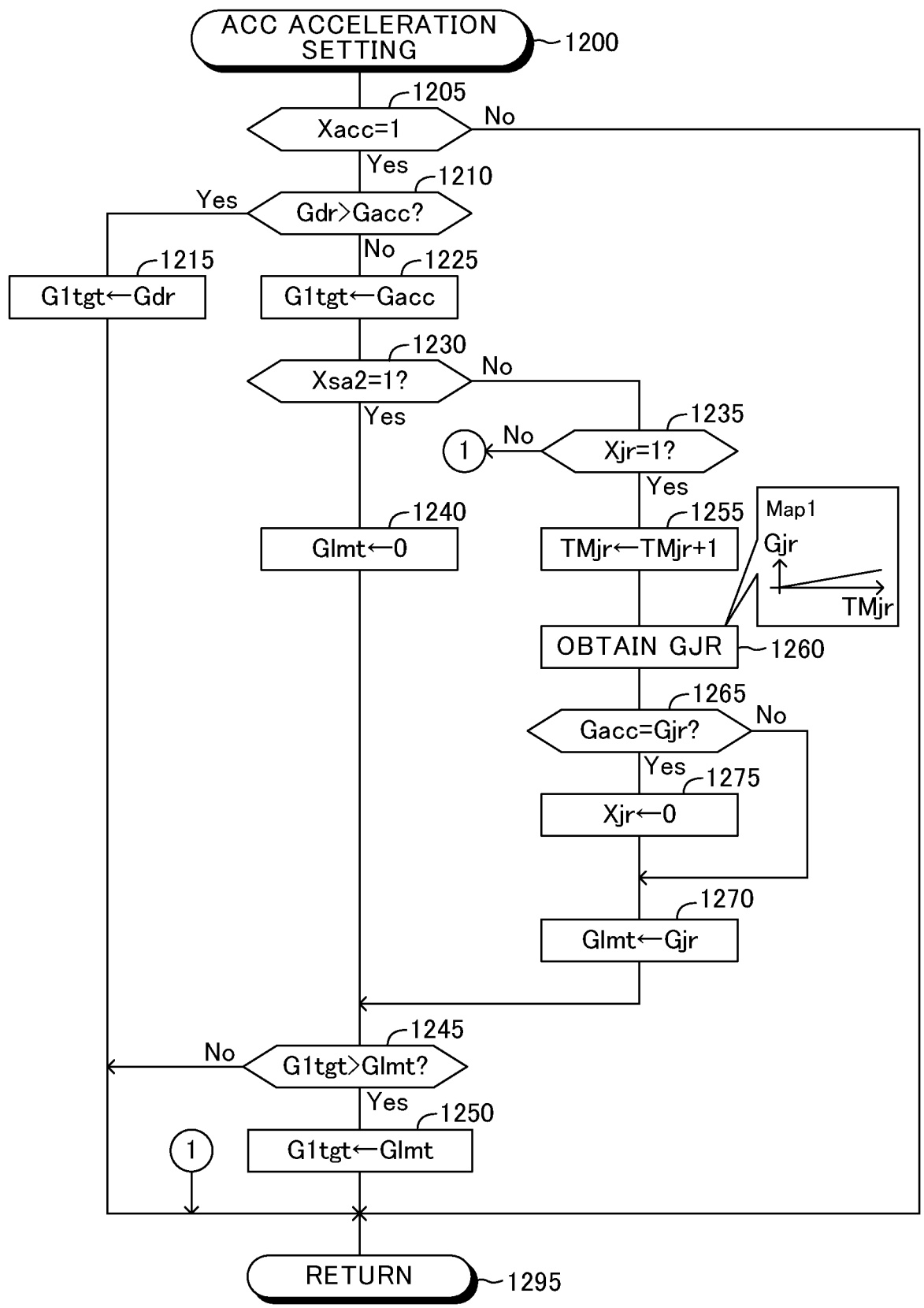
FIG. 12 is a flowchart illustrating an ACC acceleration setting routine executed by the CPU of the vehicle control ECU shown in FIG. 1.

The CPU is configured or programmed to execute an ACC acceleration setting routine shown by a flowchart in FIG. 12 every time a predetermined time elapses.

When an appropriate time point comes, the CPU starts processing from step 1200 in FIG. 12, and proceeds to step 1205. At step 1205, the CPU determines whether or not the value of the ACC flag Xacc is "1".

When the value of the ACC flag Xacc is "0", the CPU makes a "No" determination at step 1205, and proceeds to step 1295 to terminate the present routine tentatively.

Whereas, when the value of the ACC flag Xacc is "1", the CPU makes a "Yes" determination at step 1205, and proceeds to step 1210. At step 1210, the CPU determines whether or not a driver acceleration Gdr is greater than the ACC target acceleration Gacc. The driver acceleration Gdr is an acceleration corresponding to the acceleration pedal operation amount AP varied by the driver.

When the driver acceleration Gdr is greater than the ACC target acceleration Gacc, the CPU makes a "Yes" determination at step 1210, and proceeds to step 1215. At step 1215, the CPU sets a first target acceleration G1tgt to the driver acceleration Gdr, and proceeds to step 1295 to terminate the present routine tentatively.

Whereas, if the driver acceleration Gdr is equal to or smaller than the ACC target acceleration Gacc when the CPU proceeds to step 1210, the CPU makes a "No" determination at step 1210, and sequentially executes processes of step 1225 and step 1230.

Step 1225: the CPU sets the first target acceleration G1tgt to the ACC target acceleration Gacc.

Step 1230: the CPU determines whether or not the value of the second alert flag Xsa2 is "1".

When the value of the second alert flag Xsa2 is "0", the CPU makes a "No" determination at step 1230, and proceeds to step 1235. At step 1235, the CPU determines whether or not the value of the jerk limiting control flag Xjr is "1".

When the value of the jerk limiting control flag Xjr is "0", the CPU makes a "No" determination at step 1235, and proceeds to step 1295 to terminate the present routine tentatively.

Whereas, if the value of the second alert flag Xsa2 is "1" when the CPU proceeds to step 1230, the CPU makes a "Yes" determination at step 1230, and sequentially executes processes of step 1240 and step 1245.

Step 1240: the CPU sets a limiting acceleration Glmt to "0".

Step 1245: the CPU determines whether or not the first target acceleration G1tgt (ACC target acceleration Gacc) is greater than the limiting acceleration Glmt.

When the first target acceleration G1tgt is equal to or smaller than the limiting acceleration Glmt, the CPU makes a "No" determination at step 1245, and proceeds to step 1295 to terminate the present routine tentatively.

Whereas, if the first target acceleration G1tgt is greater than the limiting acceleration Glmt, the CPU makes a "Yes" determination at step 1245, and proceeds to step 1250. At step 1250, the CPU sets the first target acceleration G1tgt to the limiting acceleration Glmt, and proceeds to step 1295 to terminate the present routine tentatively.

On the other hand, if the value of the jerk limiting control flag Xjr is "1" when the CPU proceeds to step 1235, the CPU makes a "Yes" determination at step 1235, and sequentially executes processes of step 1255 to step 1265.

Step 1255: the CPU increments the value of the limiting timer TMjr by "1".

Step 1260: the CPU obtains an acceleration Gjr by applying the value of the limiting timer TMjr to a map (lookup-table) Map1.

The map Map1 has been stored in the ROM of the VCECU 20. The map Map1 defines a relationship between the value of the limiting timer TMjr and the acceleration Gjr in such a manner that the jerk does not exceed a predetermined threshold, and the acceleration Gjr gradually becomes greater as the value of the limiting timer TMjr becomes larger.

Step 1265: the CPU determines whether or not the ACC target acceleration Gacc and the acceleration Gjr become equal to each other.

When the ACC target acceleration Gacc and the acceleration Gjr are not equal to each other, the CPU makes a "No" determination at step 1265, and proceeds to step 1270. At step 1270, the CPU sets the limiting acceleration Glmt to the acceleration Gjr. Thereafter, the CPU proceeds to step 1245.

Whereas, when the ACC target acceleration Gacc and the acceleration Gjr are equal to each other, the CPU makes a "Yes" determination at step 1265, and proceeds to step 1275. At step 1275, the CPU sets the value of the jerk limiting control flag Xjr to "0". Thereafter, the CPU proceeds to step 1270.

In this manner, when the driver acceleration Gdr is equal to or smaller than the ACC target acceleration Gacc and the value of the second alert flag Xsa2 is "1", the CPU performs the acceleration suppressing control. Namely, the CPU sets the value of the limiting acceleration Glmt to "0", and sets the first target acceleration G1tgt to the limiting acceleration Glmt when the first target acceleration G1tgt (the ACC target acceleration Gacc) is greater than the limiting acceleration Glmt. This prohibits/prevents the vehicle VA from accelerating.

When the driver acceleration Gdr is equal to or smaller than the ACC target acceleration Gacc and the value of the jerk limiting control flag Xjr is "1", the CPU performs the jerk limiting control. Namely, the CPU sets the limiting acceleration Glmt to the acceleration Gjr that gradually becomes greater as the elapsed time from the start time point of the jerk limiting control become longer so that the jerk does not exceed the threshold. Then, the CPU sets the first target acceleration G1tgt to the limiting acceleration Glmt when the first target acceleration G1tgt (ACC target acceleration Gacc) is greater than the limiting acceleration Glmt. This can prevent the jerk of the vehicle VA from becoming greater than the threshold.

<Deceleration Control Routine>

Figure 13A:
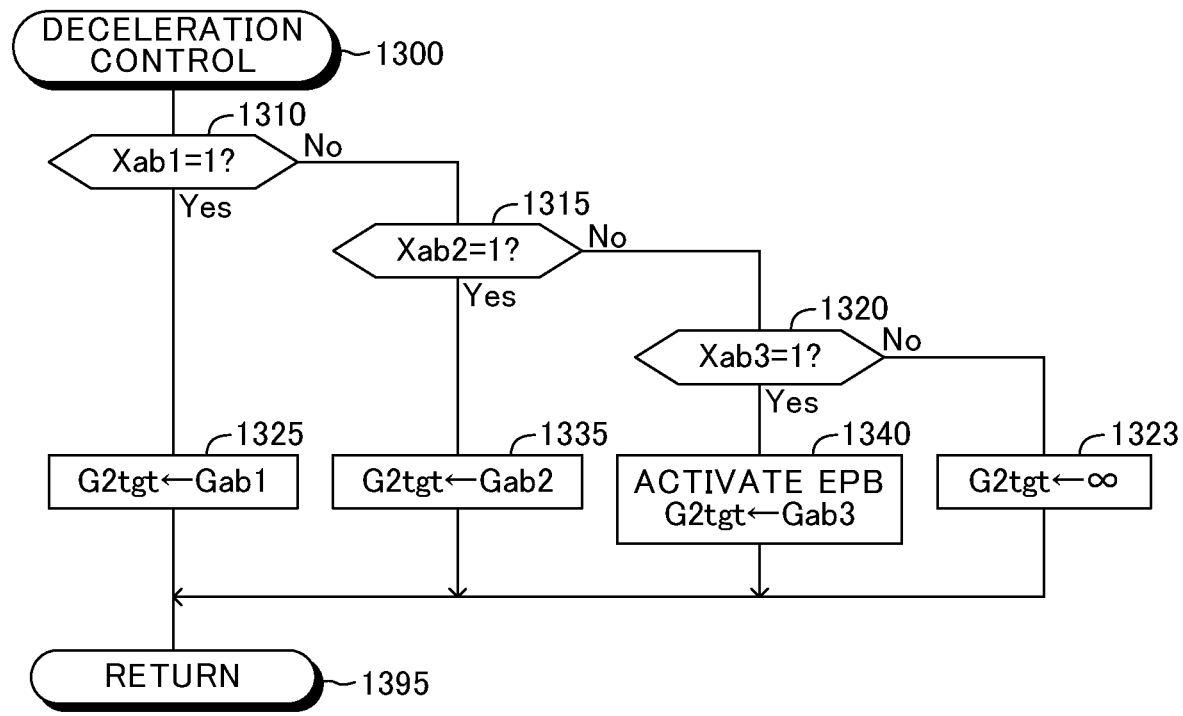
FIG. 13A is a flowchart illustrating a deceleration control routine executed by the CPU of the vehicle control ECU shown in FIG. 1.

The CPU is configured or programmed to execute a deceleration control routine shown by a flowchart in FIG. 13A every time a predetermined time elapses.

When an appropriate time point comes, the CPU starts processing from step 1300 in FIG. 13A, and proceeds to step 1310. At step 1310, the CPU determines whether or not the value of the first warning flag Xab1 is "1".

When the value of the first warning flag Xab1 is "0", the CPU makes a "No" determination at step 1310, and proceeds to step 1315. At step 1315, the CPU determines whether or not the value of the second warning flag Xab2 is "1".

When the value of the second warning flag Xab2 is "0", the CPU makes a "No" determination at step 1315, and proceeds to step 1320. At step 1320, the CPU determines whether or not the value of the third warning flag Xab3 is "1".

When the value of the third warning flag Xab3 is "0", the CPU makes a "No" determination at step 1320, and proceeds to step 1323. At step 1323, the CPU sets the second target acceleration G2tgt to "an infinite value", and proceeds to step 1395 to terminate the present routine tentatively. In this manner, when all of the values of the first warning flag Xab1, the second warning flag Xab2, and the third warning flag Xab3 are "0", the second target acceleration G2tgt is set to "the infinite value" at step 1323. This prevents the second target acceleration G2tgt from being transmitted to the engine ECU 30 and the brake ECU 40 through a target acceleration transmitting routine shown in FIG. 13B, and causes the first target acceleration G1tgt to be transmitted to the engine ECU 30 and the brake ECU 40.

If the value of the first warning flag Xab1 is "1" when the CPU proceeds to step 1310, the CPU makes a "Yes" determination at step 1310, and proceeds to step 1325. At step 1325, the CPU sets the second target acceleration G2tgt to a first acceleration Gab1, and proceeds to step 1395 to terminate the present routine tentatively.

If the value of the second warning flag Xab2 is "1" when the CPU proceeds to step 1315, the CPU makes a "Yes" determination at step 1315, and proceeds to step 1335. At step 1335, the CPU sets the second target acceleration G2tgt to a second acceleration Gab2, and proceeds to step 1395 to terminate the present routine tentatively.

If the value of the third warning flag Xab3 is "1" when the CPU proceeds to step 1320, the CPU makes a "Yes" determination at step 1320, and proceeds to step 1340. At step 1340, the CPU activates the EPB, and sets the second target acceleration G2tgt to "a third acceleration Gab3 that has been set to a predetermined negative value". Thereafter, the CPU proceeds to step 1395 to terminate the present routine tentatively.

<Target Acceleration Transmitting Routine>

Figure 13B:
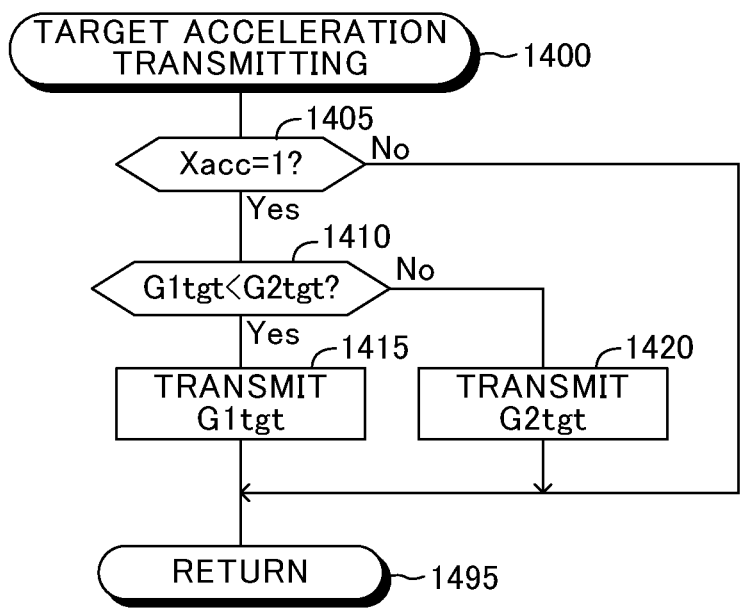
FIG. 13B is a flowchart illustrating a target acceleration transmitting routine executed by the CPU of the vehicle control ECU shown in FIG. 1.

The CPU is configured or programmed to execute the target acceleration transmitting routine shown by a flowchart in FIG. 13B every time a predetermined time elapses.

When an appropriate time point comes, the CPU starts processing from step 1400 in FIG. 13B, and proceeds to step 1405. At step 1405, the CPU determines whether or not the value of the ACC flag Xacc is "1".

When the value of the ACC flag Xacc is "0", the CPU makes a "No" determination at step 1405, and proceeds to step 1495 to terminate the present routine tentatively.

When the value of the ACC flag Xacc is "1", the CPU makes a "Yes" determination at step 1405, and proceeds to step 1410. At step 1410, the CPU determines whether or not the first target acceleration G1tgt is smaller than the second target acceleration G2tgt.

When the first target acceleration G1tgt is smaller than the second target acceleration G2tgt, the CPU makes a "Yes" determination at step 1410, and proceeds to step 1415. At step 1415, the CPU transmits the first target acceleration G1tgt to the engine ECU 30 and the brake ECU 40. Thereafter, the CPU proceeds to step 1495 to terminate the present routine tentatively.

Whereas, when the first target acceleration G1tgt is equal to or greater than the second target acceleration G2tgt, the CPU makes a "No" determination at step 1410, and proceeds to step 1420. At step 1420, the CPU transmits the second target acceleration G2tgt to the engine ECU 30 and the brake ECU 40. Thereafter, the CPU proceeds to step 1495 to terminate the present routine tentatively.

In this manner, the VCECU 20 performs the acceleration suppressing control instead of the deceleration control, when the distracted condition becomes satisfied. Therefore, the possibility that the inter-vehicle distance between the following vehicle and the vehicle VA suddenly becomes shorter can be decreased. Furthermore, since the vehicle VA is prevented from being accelerated in the period in which the driver is in the distracted state, the possibility that the driver feels uneasy (when he/she returns to the normal state) can also be decreased.

The present disclosure should not be limited to the above-described embodiment, and may employ various modifications within the scope of the present disclosure.

(First Modification)

Figure 2:
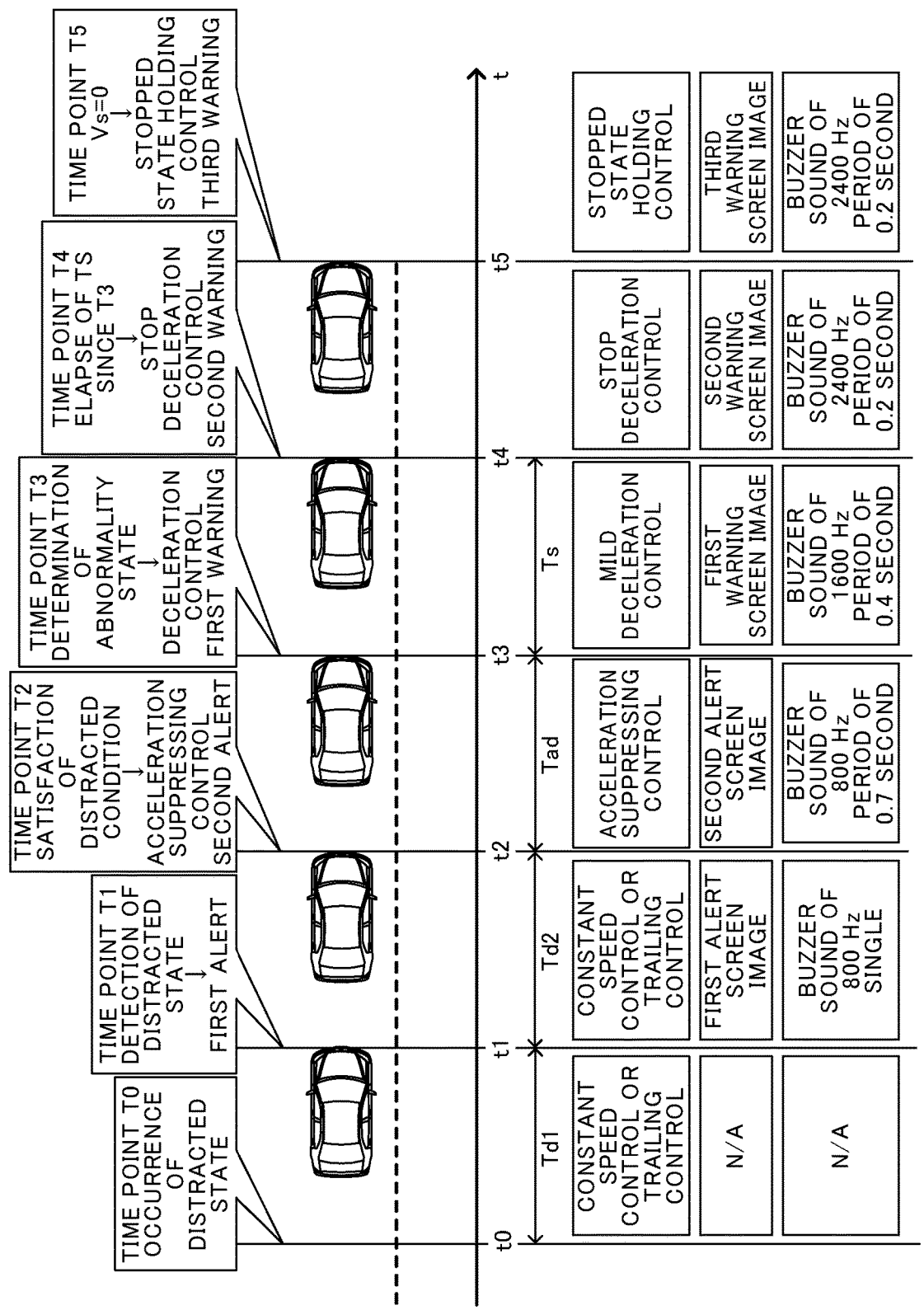
FIG. 2 is a drawing for describing an example of operations of the vehicle control apparatus according to the embodiment of the present disclosure, when a state of a driver changes from a distracted state to an abnormality state.

The VCECU 20 according to the present modification determines that the distracted condition becomes satisfied so as to start performing the second alert notification and the acceleration suppressing control, when a positional relationship between an object and the vehicle VA satisfies a predetermined condition even before the time point at which the second determination time Td2 elapses from the time point t1 shown in FIG. 2.

Figure 14:
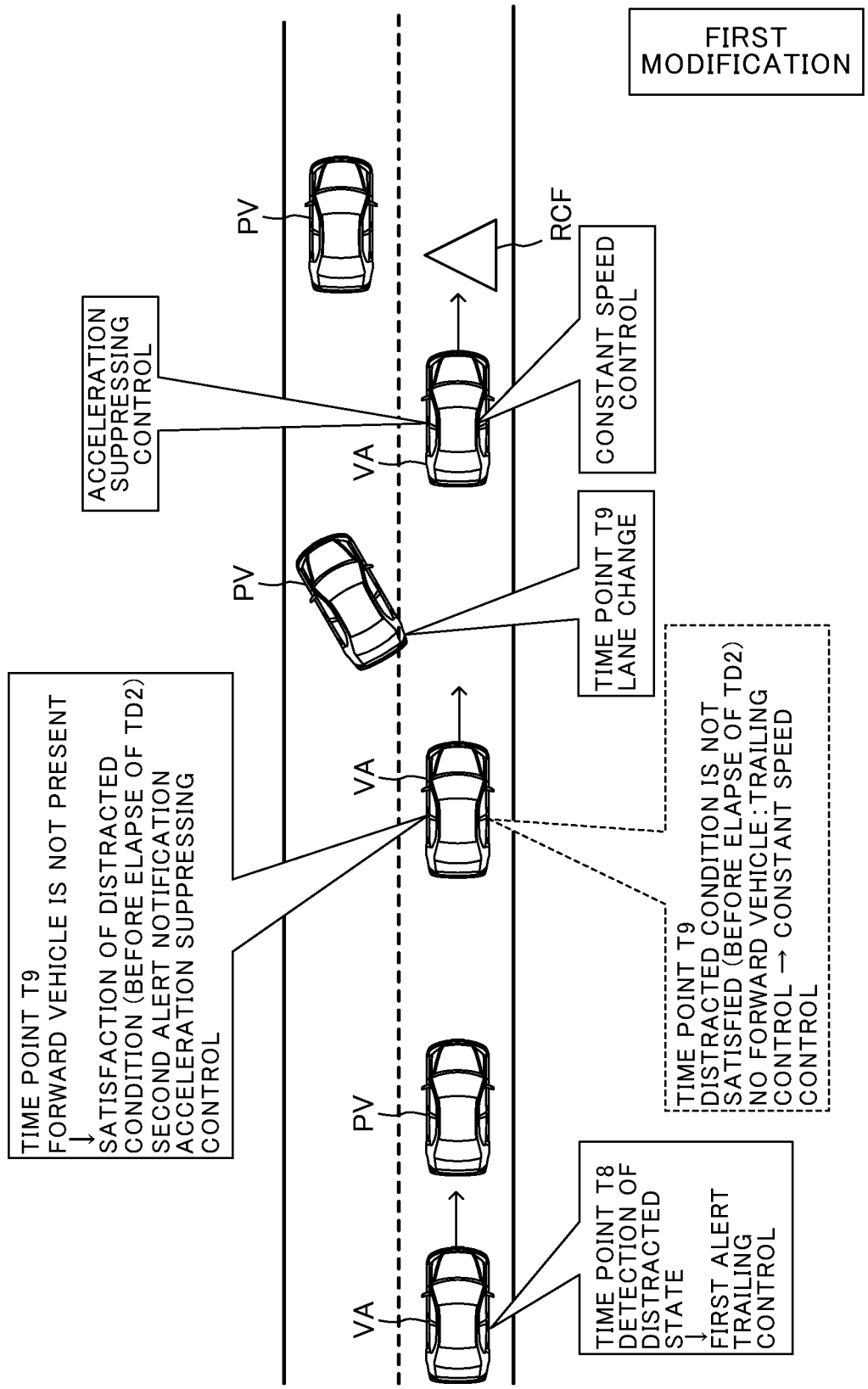
FIG. 14 is a drawing for describing an example of operations of the vehicle control apparatus according to a first modification of the embodiment of the present disclosure.

At a time point t8 shown in FIG. 14, the VCECU 20 determines that a forward vehicle (preceding vehicle) PV has been present, and therefore, it is performing the trailing control. In addition, at the time point t8, the VCECU 20 determines that the first determination time Td1 has elapsed since it started to detect that the driver was in the distracted state, and thus, starts performing the first alert notification.

At a time point t9 before the second determination time Td2 elapses from the time point t8, the VCECU 20 no longer detects the forward vehicle (preceding vehicle) PV. Thus, the VCECU 20 switches the ACC control from the trailing control to the constant speed control.

At any time point between the time point t8 and the time point t9, a driver of the forward vehicle (preceding vehicle) PV finds a road construction fence RCF, and starts changing lanes. The driver of the vehicle VA has not become aware of the road construction fence RCF since he/she is in the distracted state. At the time point t9, there is a possibility that the vehicle VA is accelerated because the ACC control is switched from the trailing control to the constant speed control. This acceleration may cause the vehicle VA to rapidly come closer to the road construction fence RCF, and thus, cause the driver of the vehicle VA to feel uneasy if he/she returns to the normal state.

In the present modification, when the VCECU 20 no longer detects the forward vehicle (preceding vehicle) PV at the time point t9 even before the second determination time Td2 elapses from the time point t8, the VCECU 20 determines that the above-described predetermined condition becomes satisfied so as to determine that the distracted condition becomes satisfied, and therefore, the VCECU 20 starts performing the second alert notification and the acceleration suppressing control. This prevents the vehicle VA from being accelerated, when and after the forward vehicle PV is no longer detected so that the ACC control is switched from the trailing control to the constant speed control. Therefore, a possibility that the vehicle VA rapidly comes closer to the road construction fence RCF can be decreased.

Figure 15:
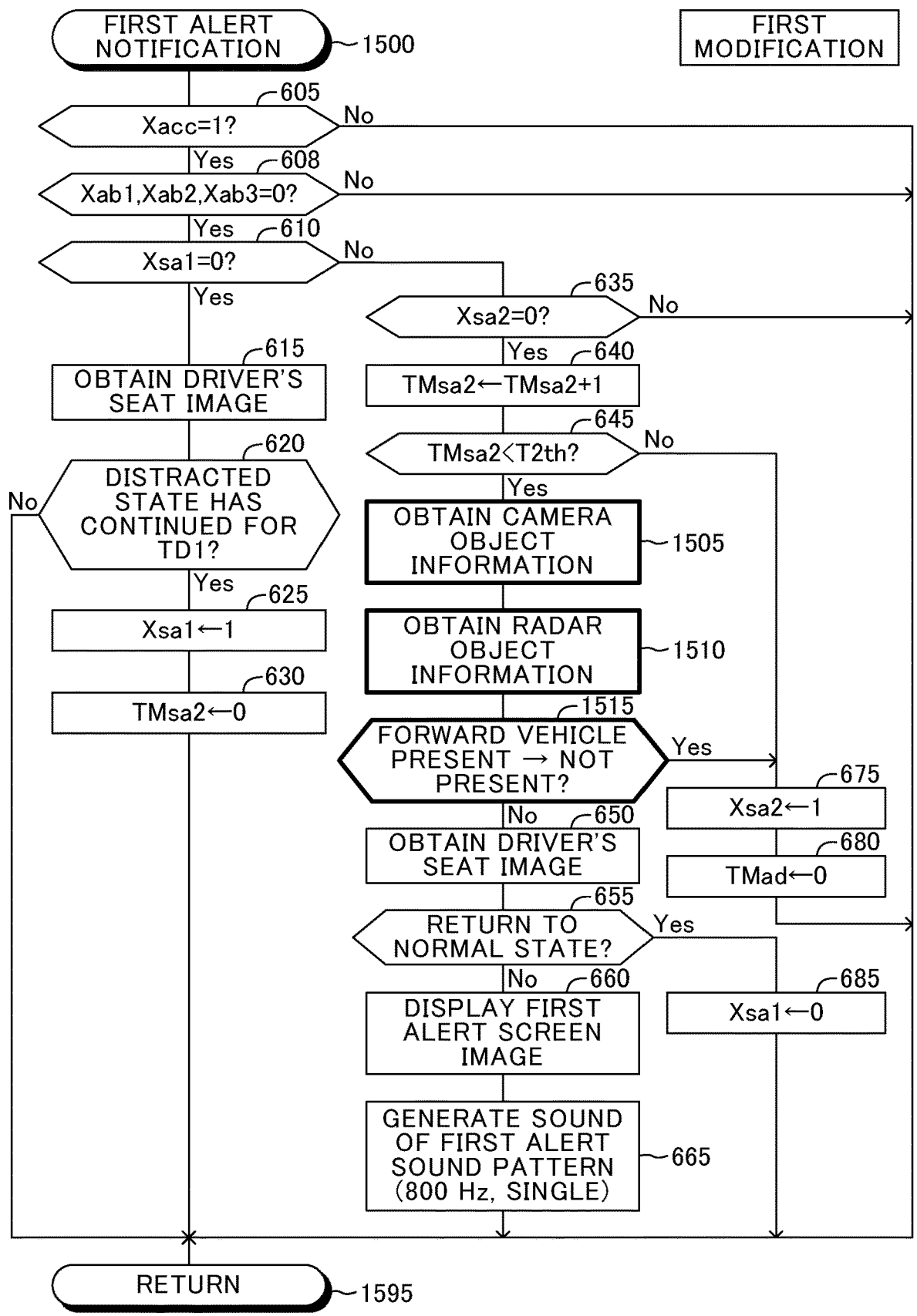
FIG. 15 is a flowchart illustrating a first alert notification routine of the first modification of the embodiment of the present disclosure.

The CPU of the VCECU 20 according to the present modification is configured or programmed to execute a first alert notification routine shown by a flowchart in FIG. 15 in place of the first alert notification routine shown in FIG. 6, every time a predetermined time elapses. It should be noted that a step shown in FIG. 15 at which the same process as the process of the corresponding step shown in FIG. 6 is executed is given the same symbol/reference as one given to that step shown in FIG. 6. A description for that step shown in FIG. 15 is omitted.

When an appropriate time point comes, the CPU starts processing from step 1500 in FIG. 15. When the second determination time Td2 has not yet elapsed since the start time point of the first alert notification, the CPU makes a "Yes" determination at each of step 605 and step 608, both shown in FIG. 15, makes a "No" determination at step 610 shown in FIG. 15, and makes a "Yes" determination at step 635 shown in FIG. 15. Thereafter, the CPU executes the process of step 640 shown in FIG. 15, makes a "Yes" determination at step 645 shown in FIG. 15, and sequentially executes processes of step 1505 to step 1515.

Step 1505: the CPU obtains the camera object information from the camera device 22.

Step 1510: the CPU obtains the radar object information from the millimeter wave radar device 23.

Step 1515: the CPU determines, based on the camera object information and the radar object information, whether or not a state (surrounding state) has changed from a state (detecting state) in which the forward vehicle is detected to a state (non-detecting state) in which the forward vehicle is not detected.

When the surrounding state has changed from the detecting state to the non-detecting state, the CPU determines that the distracted condition becomes satisfied. In this case, the CPU makes a "Yes" determination at step 1515, and executes the processes of step 675 and step 680. Thereafter, the CPU proceeds to step 1595 to terminate the present routine tentatively.

Whereas, when the surrounding state has not changed from the detecting state to the non-detecting state, the CPU makes a "No" determination at step 1515, and proceeds to step 650 shown in FIG. 15.

In this manner, the VCECU 20 determines that the distracted condition becomes satisfied when the predetermined condition that is a condition to be satisfied when the forward vehicle (preceding vehicle) PV that has been detected is no longer detected becomes satisfied, even before the second determination time Td2 elapses from the time point t1 shown in FIG. 2, so as to start performing the acceleration suppressing control. Accordingly, the possibility that the vehicle VA is accelerated because of the switch of the ACC control from the trailing control to the constant speed control while the driver is in the distracted state can be decreased.

The above-described predetermined condition is not limited to the above condition, but may be any condition to be satisfied when a relationship (positional relationship) between an object present in front of the vehicle VA and the vehicle VA has changed, and thus, necessity of monitoring a surrounding by the driver is increased as compared to a state before the relationship (positional relationship) between the object present in front of the vehicle VA and the vehicle VA has changed. For example, the above-described predetermined condition may be a condition to be satisfied when the surrounding state has changed from the non-detecting state (of the forward vehicle PV) to the detecting state (of the forward vehicle PV).

Furthermore, the above-described predetermined condition may be a condition to be satisfied when a time to collision (collision required time) TTC for the vehicle VA to take until the vehicle VA would collide with an object becomes equal to or shorter than a predetermined time threshold. The time to collision (collision required time) is obtained by dividing a distance between the vehicle VA and the object by a relative speed of the object.

In addition, the above-described predetermined condition may be a condition to be satisfied when a pedestrian is detected in a predetermined area in front of the vehicle VA.
(Second Modification)

The VCECU 20 according to the present modification detects whether or not the driver is in the distracted state regardless of whether or not the ACC is being executed, and determines whether or not the distracted condition becomes satisfied after it is detected that the driver is in the distracted state.

More specifically, the CPU proceeds to step 608 shown in FIG. 6 without executing the process of step 605 shown in FIG. 6, when executing the first alert notification routine. Similarly, the CPU proceeds to step 708 shown in FIG. 7 without executing the process of step 705 shown in FIG. 7, when executing the second alert notification routine.

Furthermore, when the distracted condition becomes satisfied, the VCECU 20 performs the acceleration suppressing control regardless of whether or not the ACC is being executed. More specifically, the CPU is configured or programmed to execute an acceleration setting routine shown in FIG. 16 in addition to the ACC acceleration setting routine shown in FIG. 12.

<Acceleration Setting Routine>

Figure 16:
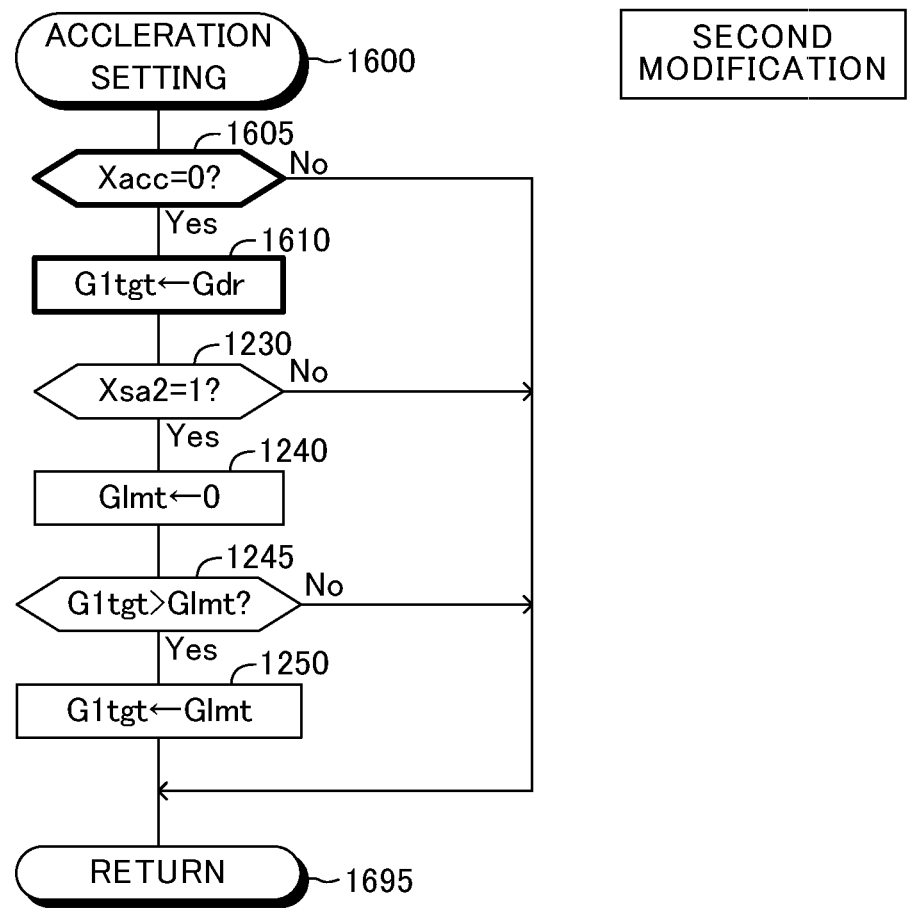
FIG. 16 is a flowchart illustrating an acceleration setting routine executed by the CPU of the vehicle control ECU according to a second modification of the embodiment of the present disclosure.

The CPU is configured or programmed to execute the acceleration setting routine shown by a flowchart in FIG. 16 every time a predetermined time elapses. It should be noted that a step shown in FIG. 16 at which the same process as the process of the corresponding step shown in FIG. 12 is executed is given the same symbol/reference as one given to that step shown in FIG. 12. A description for that step shown in FIG. 16 may be omitted.

When an appropriate time point comes, the CPU starts processing from step 1600 in FIG. 16, and proceeds to step 1605. At step 1605, the CPU determines whether or not the value of the ACC flag Xacc is "0".

When the value of the ACC flag Xacc is "0", the CPU makes a "Yes" determination at step 1605, and proceeds to step 1610. At step 1610, the CPU sets the first target acceleration G1tgt to the driver acceleration Gdr, and proceeds to step 1230 shown in FIG. 16. When the value of the second alert flag Xsa2 is "0", the CPU makes a "No"

determination at step 1230 shown in FIG. 16, and proceeds to step 1695 to terminate the present routine tentatively.

Whereas, when the value of the second alert flag Xsa2 is "1", the CPU makes a "Yes" determination at step 1230 shown in FIG. 16, sets the limiting acceleration Glmt to "0" at step 1240 shown in FIG. 16, and proceeds to step 1245 shown in FIG. 16. At step 1245 shown in FIG. 16, the CPU determines whether or not the first target acceleration G1tgt (driver acceleration Gdr) is greater than the limiting acceleration Glmt.

When the first target acceleration G1tgt (driver acceleration Gdr) is greater than the limiting acceleration Glmt, the CPU makes a "Yes" determination at step 1245 shown in FIG. 16, and proceeds to step 1250 shown in FIG. 16. At step 1250 shown in FIG. 16, the CPU sets the first target acceleration G1tgt to the limiting acceleration Glmt. Thereafter, the CPU proceeds to step 1695 to terminate the present routine tentatively.

In contrast, when the first target acceleration G1tgt (driver acceleration Gdr) is equal to or smaller than the limiting acceleration Glmt, the CPU makes a "No" determination at step 1245 shown in FIG. 16, and proceeds to step 1695 to terminate the present routine tentatively.

When the value of the ACC flag Xacc is "1", the CPU makes a "No" determination at step 1605, and proceeds to step 1695 to terminate the present routine tentatively.

In the present modification, when executing the target acceleration transmitting routine shown in FIG. 13B, the CPU proceeds to step 1410 regardless of the value of the ACC flag Xacc without executing the process of step 1405. Then, the CPU transmits the first target acceleration G1tgt or the second target acceleration G2tgt, whichever smaller. The first target acceleration G1tgt is set in the routine shown in FIG. 12 when the value of the ACC flag Xacc is "1", and is set in the routine shown in FIG. 16 when the value of the ACC flag Xacc is "0".

(Third Modification)

In the above-described embodiment, the VCECU 20 starts performing the first alert notification when the driver's distracted state continues for (over) the first determination time Td1. In addition, when the distracted state continues for (over) the second determination time Td2 from the start time point of the first alert notification, the VCECU 20 according to the above-described embodiment determines that the distraction condition becomes satisfied so as to start performing the second alert notification and the acceleration suppressing control.

In contrast, the VCECU 20 according to the present modification determines that the distraction condition becomes satisfied so as to start performing the second alert notification and the acceleration suppressing control without performing the first alert notification, when the driver's distracted state continues for (over) the first determination time Td1.

(Fourth Modification)

In the above-described embodiment, the CPU determines that the driver is holding the steering wheel SW when the steering torque Tr is equal to or greater than the torque threshold Trth. However, how to determine whether or not the driver is holding the steering wheel SW is not limited to the above. For example, the present control apparatus 10 may comprise a touch sensor configured to detect a state in which a hand of the driver is touching the steering wheel SW. In this case, the CPU may determine, based on a signal detected by the touch sensor, whether or not the driver is holding the steering wheel SW. Furthermore, the CPU may determine, based on the driver's seat image, whether or not the driver is holding the steering wheel SW.

(Fifth Modification)

In the above-described embodiment, the VCECU 20 determines that the driver has fallen into the abnormality state when the distracted case continues for (over) the abnormality determination time Tad since the time point at which the distracted condition becomes satisfied and the second alert notification is started. However, how to determine that the driver has fallen into the abnormality state is not limited to the above. For example, the VCECU 20 according to the present modification determines that the driver has fallen into the abnormality state, when at least one of an acceleration pedal non operating state and a steering wheel non holding state, in addition to the distracted case, continues for (over) the abnormality determination time Tad since the start time point of the second alert notification.

The acceleration pedal non operating state is a state in which the driver does not depress the acceleration pedal 32a (namely, a state in which the driver keeps his/her foot off the acceleration pedal 32a).

The steering wheel non holding state is a state in which the driver is not holding the steering wheel SW.

(Sixth Modification)

The present control apparatus 10 may be configured to comprise at least one of the camera device 22 and the millimeter wave radar device 23. A sensor, that the present control apparatus 10 comprises, for detecting an object may be referred to as an "object sensor".

The millimeter wave radar device 23 may be replaced with a remote sensing device capable of detecting an object by transmitting/radiating radio wave in place of the millimeter wave and receiving a reflected wave of the radiated radio wave.

(Seventh Modification)

The present control apparatus 10 may be applied to not only the above-described vehicle with the internal combustion engine, but also to a vehicle including a hybrid electric vehicle (HEV), a plug-in hybrid electric vehicle (PHEV), a fuel cell electric vehicle (FCEV), and a battery electric vehicle (BEV). The present control apparatus 10 can be applied to an autonomous driving vehicle.

The present disclosure includes a nonvolatile storage media, storing a vehicle control program for implementing the functions of the above-described present control apparatus 10, and from which the computer can read the stored program.

What is claimed is:

1. A vehicle control apparatus comprising a control unit, capable of communicating with a driver's seat camera device configured to obtain a driver's seat image by taking a picture of a driver sitting in a driver's seat of a vehicle, which controls an acceleration and a deceleration of said vehicle, said control unit configured to:

perform an acceleration suppressing control to suppress an acceleration of said vehicle, when a distracted state detected based on said driver's seat image continues for a predetermined first time, said distracted state being a state in which an attentiveness for driving of said driver is impaired; and perform a deceleration control to decelerate said vehicle to stop said vehicle, when said distracted state continues for a predetermined second time that is longer than said first time, wherein, said control unit is configured to:
start a second alert notification for enhancing said attentiveness at a start time point of said acceleration suppressing control; and
determine that said distracted state continues for said second time so as to start performing said deceleration control, when said distracted state continues for a predetermined third determination time from a start time point of said second alert notification.

2. The vehicle control apparatus according to claim 1, wherein, said control unit is configured to:
start a first alert notification for enhancing said attentiveness, when said distracted state continues for a predetermined first determination time; and
determine that said distracted state continues for said first time so as to start performing said acceleration suppressing control, when said distracted state continues for a predetermined second determination time from a start time point of said first alert notification.

3. The vehicle control apparatus according to claim 1, wherein, said control unit is configured to:
end said acceleration suppressing control and start performing a jerk limiting control to control said vehicle in such a manner that a jerk that is a differential value of an acceleration of said vehicle with respect to time does not exceed a predetermined threshold, when said driver is no longer in said distracted state before said distracted state continues for the predetermined third determination time.

4. The vehicle control apparatus according to claim 1, wherein, said control unit is configured to:
once starting said deceleration control, continue performing said deceleration control until a predetermined operation is performed even when said driver is no longer in said distracted state.

5. The vehicle control apparatus according to claim 1, further comprising an object sensor which detects an object present in front of said vehicle,
wherein, said control unit is configured to:
perform said acceleration suppressing control, even before said distracted state continues for said first time, when a predetermined condition becomes satisfied, said predetermined condition being a condition to be satisfied when a relationship between said object detected by said object sensor and said vehicle has changed, and thus, necessity of monitoring a surrounding of said vehicle by said driver is increased as compared to a state before said relationship has changed.

6. The vehicle control apparatus according to claim 5, wherein, said control unit is configured to:
perform a constant speed control to cause an acceleration of said vehicle to coincide with a target acceleration that lets a speed of said vehicle become equal to a set vehicle speed, when said object sensor does not detect a forward vehicle traveling in front of said vehicle;
perform an inter-vehicle-distance maintaining control to cause an acceleration of said vehicle to coincide with a target acceleration that maintains an inter vehicle distance to said forward vehicle at a set inter vehicle distance, when said object sensor detects said forward vehicle; and
perform said acceleration suppressing control, when said forward vehicle that has been detected by said object sensor is no longer detected, and thus, determines that said predetermined condition becomes satisfied.

7. A vehicle comprising the vehicle control apparatus according to claim 1.

8. An acceleration-and-deceleration control method for controlling an acceleration and a deceleration of a vehicle based on a state of a driver sitting in a driver's seat of said vehicle, comprising:
a first step of performing an acceleration suppressing control to suppress an acceleration of said vehicle, when a distracted state detected based on a driver's seat image obtained by a driver's seat camera device by taking a picture of said driver sitting in said driver's seat continues for a predetermined first time, said distracted state being a state in which an attentiveness for driving of said driver is impaired; and
a second step of performing a deceleration control to decelerate said vehicle to stop said vehicle, when said distracted state continues for a predetermined second time that is longer than said first time,
further comprising:
starting a second alert notification for enhancing said attentiveness at a start time point of said acceleration suppressing control; and
determining that said distracted state continues for said second time so as to start performing said deceleration control, when said distracted state continues for a predetermined third determination time from a start time point of said second alert notification.

9. A program storage device, readable by machine, storing a program for controlling an acceleration and a deceleration of a vehicle based on a state of a driver sitting in a driver's seat of said vehicle,
said program causing a computer to implement processes of:
a first step of performing an acceleration suppressing control to suppress an acceleration of said vehicle, when a distracted state detected based on a driver's seat image obtained by a driver's seat camera device by taking a picture of said driver sitting in said driver's seat continues for a predetermined first time, said distracted state being a state in which an attentiveness for driving of said driver is impaired; and
a second step of performing a deceleration control to decelerate said vehicle to stop said vehicle, when said distracted state continues for a predetermined second time that is longer than said first time,
further comprising:
starting a second alert notification for enhancing said attentiveness at a start time point of said acceleration suppressing control; and
determining that said distracted state continues for said second time so as to start performing said deceleration control, when said distracted state continues for a predetermined third determination time from a start time point of said second alert notification.

\* \* \* \* \*